(12) United States Patent
Iyer et al.

(10) Patent No.: US 11,347,425 B2
(45) Date of Patent: May 31, 2022

(54) DATA MOVER SELECTION SYSTEM

(71) Applicant: Dell Products L.P., Round Rock, TX (US)

(72) Inventors: Shyam Iyer, Cedar Park, TX (US); Srinivas Giri Raju Gowda, Santa Clara, CA (US); Anh Dinh Luong, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 2 days.

(21) Appl. No.: 16/940,611

(22) Filed: Jul. 28, 2020

(65) Prior Publication Data

US 2022/0035550 A1    Feb. 3, 2022

(51) Int. Cl.
*G06F 3/06*    (2006.01)

(52) U.S. Cl.
CPC .......... *G06F 3/0647* (2013.01); *G06F 3/0604* (2013.01); *G06F 3/0683* (2013.01)

(58) Field of Classification Search
CPC ...... G06F 9/505; G06F 9/5083; G06F 3/0647; G06F 3/0683; G06F 3/0604; H04L 67/1029
See application file for complete search history.

(56) References Cited

U.S. PATENT DOCUMENTS 7,844,756 B2    11/2010    Cannon et al.
10,795,735 B1 *    10/2020    Potnis ..................... G06F 3/067

* cited by examiner

*Primary Examiner* — Gary W. Cygiel
(74) *Attorney, Agent, or Firm* — Joseph Mencher

(57) ABSTRACT

A data mover selection system includes a memory system coupled to first and second data mover devices, and an operating system coupled to the first and second data mover devices. The operating system determines that a first data transfer operation provides for the transfer of data between first and second memory locations in the memory system, and identifies the first data mover device for performing the first data transfer operation based on the first data mover device having a higher priority relative to the second data mover device for performing data transfers between the first and second memory locations in the memory system. In response, the operating system transmits a first data transfer instruction to the first data mover device that causes the first data mover device to perform the first data transfer operation to transfer data between the first and second memory locations in the memory system.

20 Claims, 13 Drawing Sheets

| MEMORY ADDRESS | DESTINATION (0-0xFFF) | DESTINATION (0x1000-0x1FFF) | DESTINATION (0x2000-0x2FFF) | DESTINATION (0x3000-0X3FFF) |
|---|---|---|---|---|
| SOURCE (0-0xFFF) | 1. DATA MOVER 204c | 1. DATA MOVER 204c | 1. DATA MOVER 204c <br> 2. DATA MOVER 206c | 1. DATA MOVER 204c <br> 2. DATA MOVER 206c |
| SOURCE (0x1000-0x1FFF) | 1. DATA MOVER 204c | 1. DATA MOVER 204c | 1. DATA MOVER 204c <br> 2. DATA MOVER 206c | 1. DATA MOVER 204c <br> 2. DATA MOVER 206c |
| SOURCE (0x2000-0x2FFF) | 1. DATA MOVER 206c <br> 2. DATA MOVER 204c | 1. DATA MOVER 206c <br> 2. DATA MOVER 204c | 1. DATA MOVER 206c | 1. DATA MOVER 206c |
| SOURCE (0x3000-0x3FFF) | 1. DATA MOVER 206c <br> 2. DATA MOVER 204c | 1. DATA MOVER 206c <br> 2. DATA MOVER 204c | 1. DATA MOVER 206c | 1. DATA MOVER 206c |

BIOS DATABASE 210

| MEMORY ADDRESS | DESTINATION (0-0xFFF) | DESTINATION (0x1000-0x1FFF) | DESTINATION (0x2000-0x2FFF) | DESTINATION (0x3000-0X3FFF) |
|---|---|---|---|---|
| SOURCE (0-0xFFF) | | 1. DATA MOVER 204c | 1. DATA MOVER 204c<br>2. DATA MOVER 206c | 1. DATA MOVER 204c<br>2. DATA MOVER 206c |
| SOURCE (0x1000-0x1FFF) | 1. DATA MOVER 204c | | 1. DATA MOVER 204c<br>2. DATA MOVER 206c | 1. DATA MOVER 204c<br>2. DATA MOVER 206c |
| SOURCE (0x2000-0x2FFF) | 1. DATA MOVER 206c<br>2. DATA MOVER 204c | 1. DATA MOVER 206c<br>2. DATA MOVER 204c | | 1. DATA MOVER 206c |
| SOURCE (0x3000-0x3FFF) | 1. DATA MOVER 206c<br>2. DATA MOVER 204c | 1. DATA MOVER 206c<br>2. DATA MOVER 204c | 1. DATA MOVER 206c | |

BIOS DATABASE 210

FIG. 5

DATA MOVER SELECTION SYSTEM

BACKGROUND

The present disclosure relates generally to information handling systems, and more particularly to selecting a data mover device for performing data transfers between memory locations in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server computing devices and/or other computing devices known in the art, sometimes utilize data mover devices in order to perform data transfers between memory locations in the computing device, and/or other data transfer operations such as, for example, data encryption operations. As will be appreciated by one of skill in the art in possession of the present disclosure, data movers may be provided in a computing device to offload data transfer operations from the processing system in the computing device, with current data mover devices implemented as part of a processor package in the processing system, a built-in controller in the computing device, an add-in card in the computing device, and/or in a variety of other manners known in the art. However, the use of data mover devices in some computing device configurations can raise some issues.

For example, the processing system in some server computing devices may include multiple processor subsystems (e.g., multiple Central Processing Units (CPUs)) coupled together by processor interconnect(s) (e.g., Ultra Path Interconnect(s) (UPI(s)) provided in processing systems available from INTEL® Corporation of Santa Clara, Calif., United States), the memory system may provide a respective memory subsystem for each processor subsystem (with each respective memory subsystem often called the "local memory" for its associated processor subsystem), and the processing system/memory system may be configured in a Non-Uniform Memory Access (NUMA) design in which each processing subsystem/memory subsystem combination provides a respective "NUMA node", with memory access times for processing subsystems depending on the memory subsystem location relative to the processor subsystem performing the memory access, and processor subsystems capable of accessing their local memory subsystem faster than non-local memory subsystems (i.e., the memory subsystem that is local to the other processor subsystem(s)).

In such NUMA configurations, a data mover device may be shared by one or more of the NUMA nodes, a respective data mover device may be provided with each NUMA node, and/or multiple data mover devices may be provided with one or more NUMA nodes. In multi-data-mover-device NUMA systems, the selection of a data mover device to perform any particular memory transfer is conventionally performed via "round-robin" techniques that attempt to distribute data transfer operations evenly across the available data mover devices that are available in the server computing device. However, similarly to the processing subsystems discussed above, memory access times for some data mover devices will depend on the memory subsystem location relative to the data mover device performing the data transfer, and thus the round-robin data mover device selection techniques discussed above can result in inefficient data transfers between memory locations in the server computing device (e.g., a data mover device selected to perform the data transfer may provide for slower data transfers relative to at least one of the other data mover devices available in the server computing device).

Accordingly, it would be desirable to provide data mover selection system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide an operating system engine that is configured to: determine that a first data transfer operation provides for the transfer of data from a first memory location in a memory system to a second memory location in the memory system; identify a first data mover device for performing the first data transfer operation based on the first data mover device having a higher priority relative to a second data mover device for performing data transfers from the first memory location in the memory system to the second memory location in the memory system; and transmit, in response to identifying the first data mover device for performing the first data transfer operation, a first data transfer instruction to the first data mover device that is configured to cause the first data mover device to perform the first data transfer operation to transfer data from the first memory location in the memory system to the second memory location in the memory system.

BRIEF DESCRIPTION OF THE DRAWINGS

FIG. 5 is a schematic view illustrating an embodiment of a BIOS database that may be provided in the computing device of FIG. 2 operating during the method of FIG. 3.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
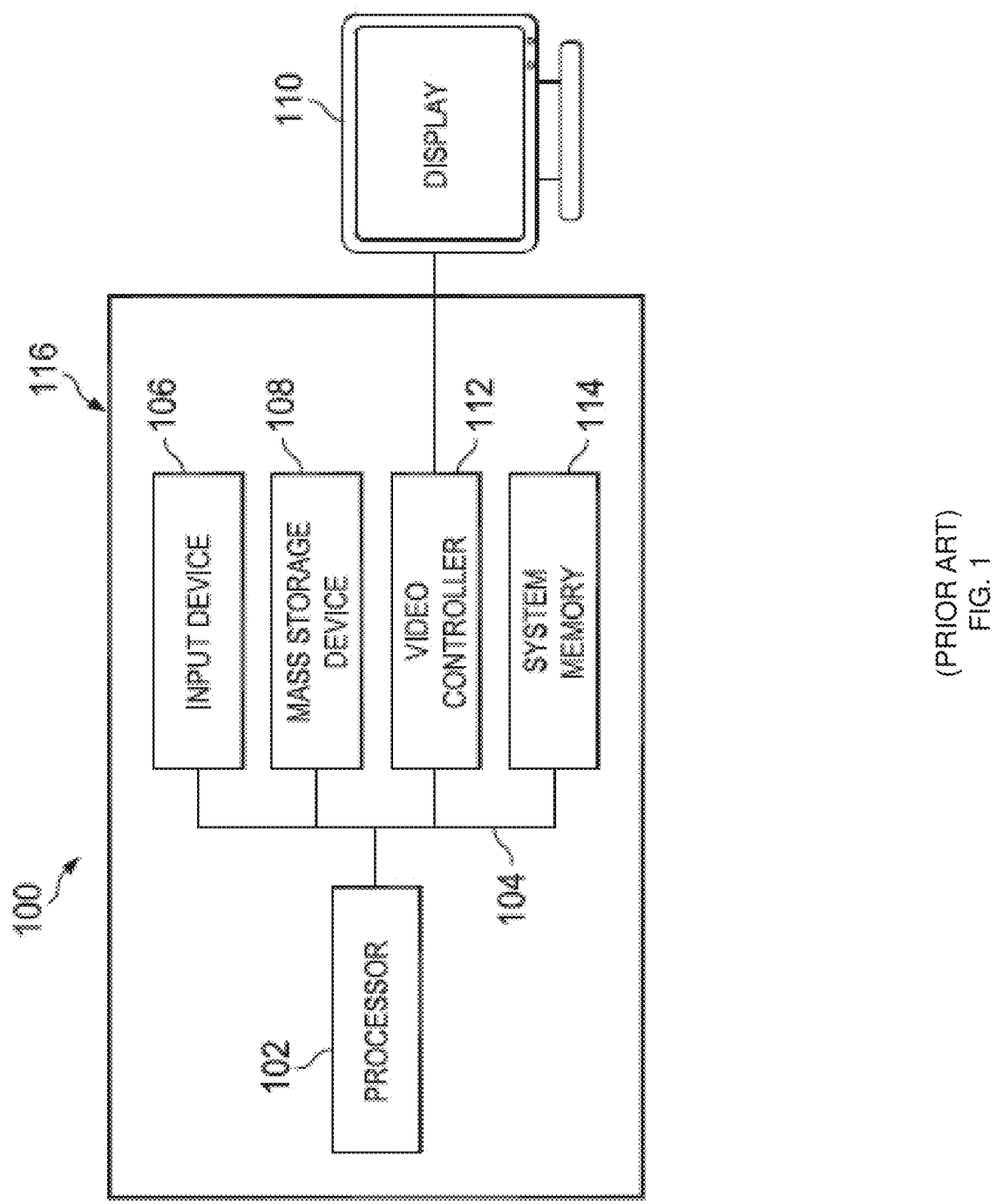
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
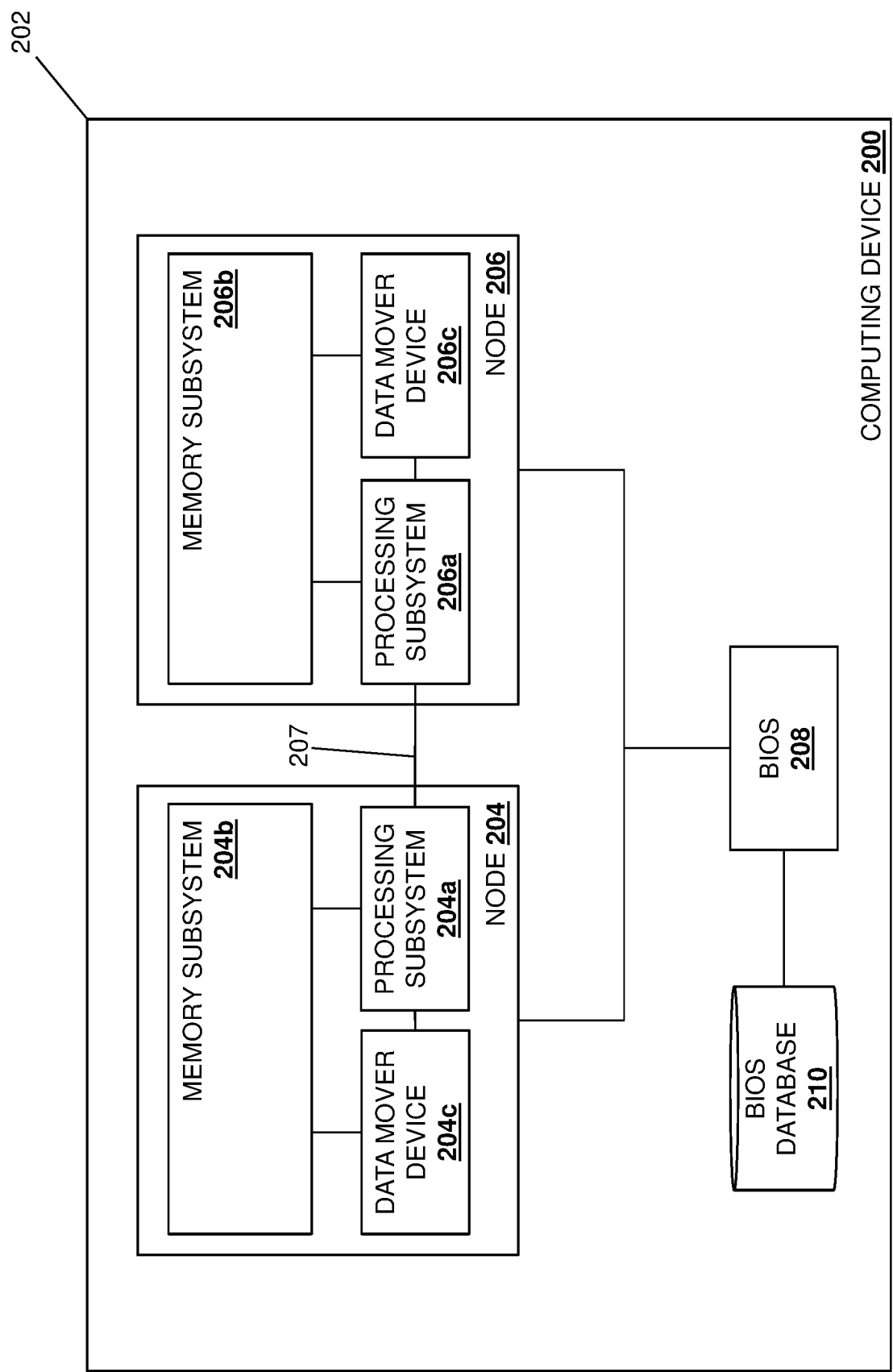
FIG. 2 is a schematic view illustrating an embodiment of a computing device that may utilize the data mover selection system of the present disclosure.

Referring now to FIG. 2, an embodiment of a computing device 200 is illustrated that may utilize the data mover selection system of the present disclosure. In an embodiment, the computing device 200 may be provided by the IHS 100 discussed above with reference to FIG. 1 and/or may include some or all of the components of the IHS 100, and in specific examples may be provided by a server computing device. However, while illustrated and discussed as being provided by a server computing device, one of skill in the art in possession of the present disclosure will recognize that the functionality of the computing device 200 discussed below may be provided by other devices that are configured to operate similarly as the computing device 200 discussed below. In the illustrated embodiment, the computing device 200 includes a chassis 302 that houses the components of the computing device 200, only some of which are illustrated below. For example, as discussed below, the chassis 302 may house a processing system (e.g., which may include the processor 102 discussed above with reference to FIG. 1) and a memory system (e.g., which may include the memory 114 discussed above with reference to FIG. 1) that is coupled to the processing system and that includes instructions that, when executed by the processing system, cause the processing system to provide an operating system engine and/or application engine(s) that are configured to perform the functionality of the operating systems, applications, and/or computing devices discussed below.

In the example illustrated in FIG. 2, the processing system and memory system housed in the chassis 202 are provided in a Non-Uniform Memory Access (NUMA) configuration including a pair of nodes 204 and 206 (e.g., "NUMA nodes"). However, while only two nodes 204 and 206 are illustrated and described in the examples below, one of skill in the art in possession of the present disclosure will recognize that NUMA configurations may include additional nodes that are similar to the nodes 204 and 206 discussed herein. In the illustrated embodiment, the node 204 includes a processing subsystem 204a that is part of the processing system provided in the chassis 202 and that may be provided by a Central Processing Unit (CPU) or other processing subsystems known in the art. The node 204 also includes a memory subsystem 204b that is part of the memory system provided in the chassis 202, that is coupled to the processing subsystem 204a, and that may be provided by Dual Inline Memory Modules (DIMMs), memory controllers, and/or other memory components known in the art. The node 204 also includes a data mover device 204c that is coupled to the processing subsystem 204a and the memory subsystem 204b, and that is illustrated as being included as part of a processing subsystem package (e.g., a CPU package that provides the processing subsystem 204a/CPU) while being a separate component from the processor core(s) (i.e., in order to allow the data mover device 204c to offload data transfer operations from those processor core(s)).

Similarly, the node 206 includes a processing subsystem 206a that is part of the processing system provided in the chassis 202 and that may be provided by a Central Processing Unit (CPU) or other processing subsystems known in the art. As illustrated, the processing subsystem 204a in the node 204 and the processing subsystem 206a in the node 206 may be coupled together by a processing subsystem interconnect 207 (e.g., the UPI discussed above). The node 206 also includes a memory subsystem 206b that is part of the memory system provided in the chassis 202, that is coupled to the processing subsystem 206a, and that may be provided by Dual Inline Memory Modules (DIMMs) and/or other memory devices known in the art. The node 206 also includes a data mover device 206c that is coupled to the processing subsystem 206a and the memory subsystem 206b, and that is illustrated as being included as part of a processing subsystem package (e.g., a CPU package that provides the processing subsystem 204a/CPU) while being a separate component from the processor core(s) (i.e., in order to allow the data mover device 206c to offload data transfer operations from those processor core(s)).

However, while respective data mover devices 204c and 206c are illustrated and described below as being provided with each node, one of skill in the art in possession of the present disclosure will recognize that other data mover device configurations will fall within the scope of the present disclosure as well. For example, either of the nodes 204 and 206 may include multiple data mover devices, or may not include a data mover devices. In specific examples, the data mover devices of the present disclosure may be provided by a Pass-Through Direct Memory Access (PTDMA) engine provided by ADVANCED MICRO DEVICES® of Santa Clara, Calif., United States; a Data Streaming Accelerator (DSA) or Crystal Beach Direct Memory Access (CBDMA) engine available from INTEL® Corporation of Santa Clara, Calif., United States; and/or any other data mover device that one of skill in the art in possession of the present disclosure would recognize that enabling the direct memory-to-memory data transfers discussed herein. Furthermore, while illustrated as being provided as part of a processing subsystem package in the node, one of skill in the art in possession of the present disclosure will recognize that data mover devices may be provided as part of a built-in controller, as part of an add-in card that is connected to a motherboard in the computing device that is also coupled to the nodes 204 and 206, and/or in a variety of other data mover device configurations that will fall within the scope of the present disclosure as well.

In specific examples, the data mover devices of the present disclosure may be integrated into a Central Processing Unit (CPU) System on a Chip (SoC) such as with the AMD® PTDMA engine or INTEL® CBDMA engine discussed above, implemented as discrete Peripheral Component Interconnect express (PCIe) add-in cards that are localized to specific CPUs, and/or in any other manner that would be apparent to one of skill in the art in possession of the present disclosure. As will be appreciated by one of skill in the art in possession of the present disclosure, CPU SoC systems may provide many physical functions, with each associated with a different "distance" to memory channels that provide access to a memory subsystem. For example, the AMD® PTDMA engine discussed above provides each PTDMA engine in the same quadrant an equal distance to two available memory channels in that quadrant, but a longer distance to six available memory channels in the other quadrants. Furthermore, one of skill in the art in possession of the present disclosure will recognize that for memory-to-memory data transfers via a data mover device, memory read operations are associated with longer latencies than memory write operations, thus providing relatively lower latencies when reading from local memory subsystems and writing to remote memory subsystems As such, the processor subsystem 204a/memory subsystem 204b may provide a first NUMA node (e.g., "NUMA node 0") that includes the data mover device 204c, and the processor subsystem 206a/memory subsystem 206b may provide a second NUMA node (e.g., "NUMA node 1") that includes the data mover device 206c and that is coupled to the first NUMA node via the processing subsystem interconnect/UPI 207. However, while particular processing subsystem/memory subsystem nodes are described in a two-processing subsystem/memory subsystem node configuration, one of skill in the art in possession of the present disclosure will recognize that other processing subsystem/memory subsystem node systems will fall within the scope of the present disclosure as well. Furthermore, one of skill in the art in possession of the present disclosure will recognize that the nodes 204 and 206 illustrated in FIG. 2 provide an example of a NUMA configuration in which local memory subsystems are provided for each processing subsystem in a multi-processor system, and memory subsystem access times depend on the relative location of the memory subsystem and the processing subsystem performing the memory access operations, with processing subsystems able to access their local memory subsystems faster than memory subsystems that are not local (i.e., memory subsystems that are local to another processing subsystem.) However, while a NUMA memory design is illustrated and discussed below, other processing system/memory system configurations may benefit from the teachings of the present disclosure and thus are envisioned as falling within its scope as well.

The chassis 202 also houses a Basic Input/Output System (BIOS) 208 that one of skill in the art in possession of the present disclosure will recognize may be provided by firmware, and used to perform hardware initialization during booting operations (e.g., Power-On StartUp (POST)) for the computing device 200, as well as provide runtime services for an operating systems and/or other applications/programs provided by the computing device 200. As such, the BIOS 210 may be provided by a BIOS processing system (not illustrated, but which may include the processor 102 discussed above with reference to FIG. 1) and a BIOS memory system (not illustrated, but which may be provided by the memory 114 discussed above with reference to FIG. 1) that includes instruction that, when executed by the BIOS processing system, cause the BIOS processing system to provide a BIOS engine that is configured to performs the operations of the BIOS 210 discussed below. Furthermore, while discussed as a BIOS, one of skill in the art in possession of the present disclosure will recognize that the BIOS 210 may be provided according to the Unified Extensible Firmware Interface (UEFI) specification, which defines a software interface between operating systems and platform firmware and which was provided to replace legacy BIOS firmware, while remaining within the scope of the present disclosure as well.

The chassis 202 may also house a storage system (not illustrated, but which may include the storage 108 discussed above with reference to FIG. 1) that is coupled to the BIOS 208 (e.g., via a coupling between the storage system and the BIOS processing system) and that includes a BIOS database 210 that is configured to store any of the information utilized by the BIOS 208 discussed below. However, while a specific computing device 200 has been illustrated, one of skill in the art in possession of the present disclosure will recognize that computing devices (or other devices operating according to the teachings of the present disclosure in a manner similar to that described below for the computing device 200) may include a variety of components and/or component configurations for providing conventional computing device functionality, as well as the functionality discussed below, while remaining within the scope of the present disclosure as well.

Figure 3:
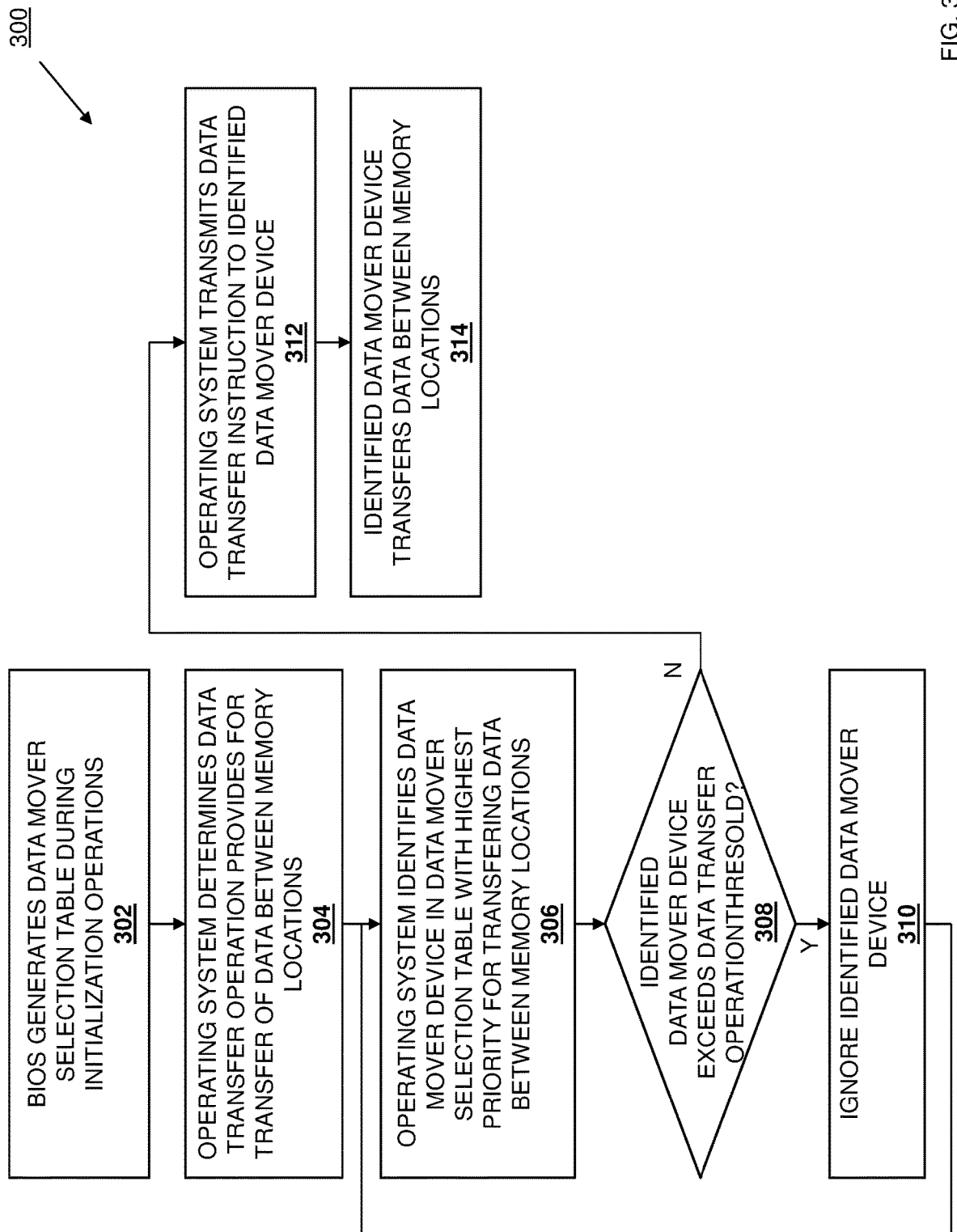
FIG. 3 is a flow chart illustrating an embodiment of a method for selecting a data mover device.

Referring now to FIG. 3, an embodiment of a method 300 for selecting data mover devices is illustrated. As discussed below, the systems and methods of the present disclosure provide for the selection of one of a plurality of data mover devices for which to perform data transfer operations between memory locations based on an "affinity" of that data mover device to at least one of those memory locations that provides that data mover device a higher priority for performing the data transfer that the other data mover devices. For example, the data mover selection system of the present disclosure may include a first data mover device and a second data mover device that are both coupled to a memory system, and an operating system that is coupled to the first data mover device and the second data mover device. The operating system determines that a first data transfer operation provides for the transfer of data from a first memory location in the memory system to a second memory location in the memory system, identifies the first data mover device for performing the first data transfer operation based on the first data mover device having a higher priority relative to the second data mover device for performing data transfers from the first memory location in the memory system to the second memory location in the memory system and, in response, transmits a first data transfer instruction to the first data mover device that is configured to cause the first data mover device to perform the first data transfer operation to transfer data from the first memory location in the memory system to the second memory location in the memory system. As such, data transfers may be performed by data mover devices that provide more efficient data transfers (relative to conventional "round robin" data mover device selections) based on their affinity to one or more of the memory locations involved in those data transfers.

Figure 4A:
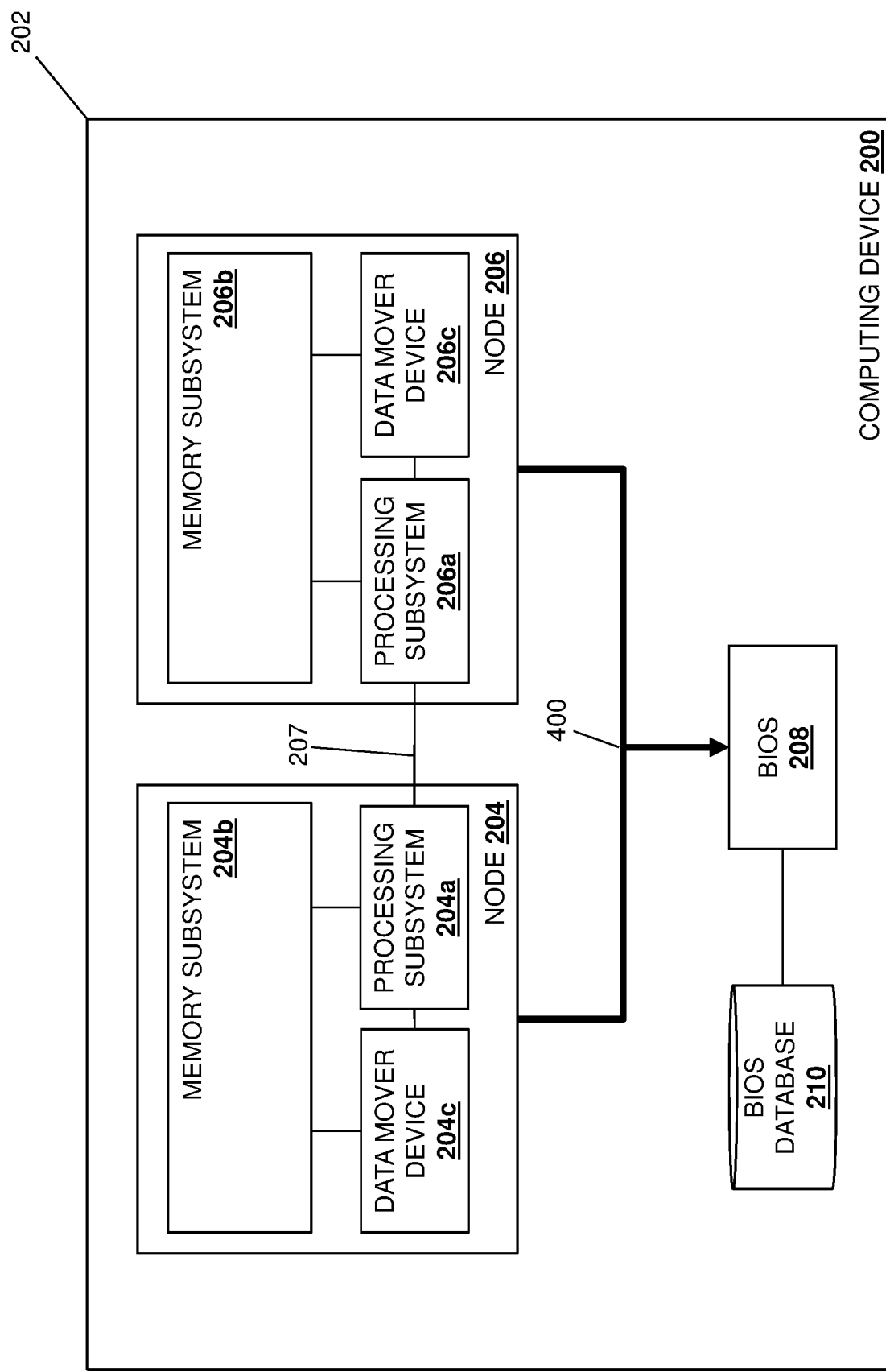
FIG. 4A is a schematic view illustrating an embodiment of the computing device of FIG. 2 operating during the method of FIG. 3.
Figure 4B:
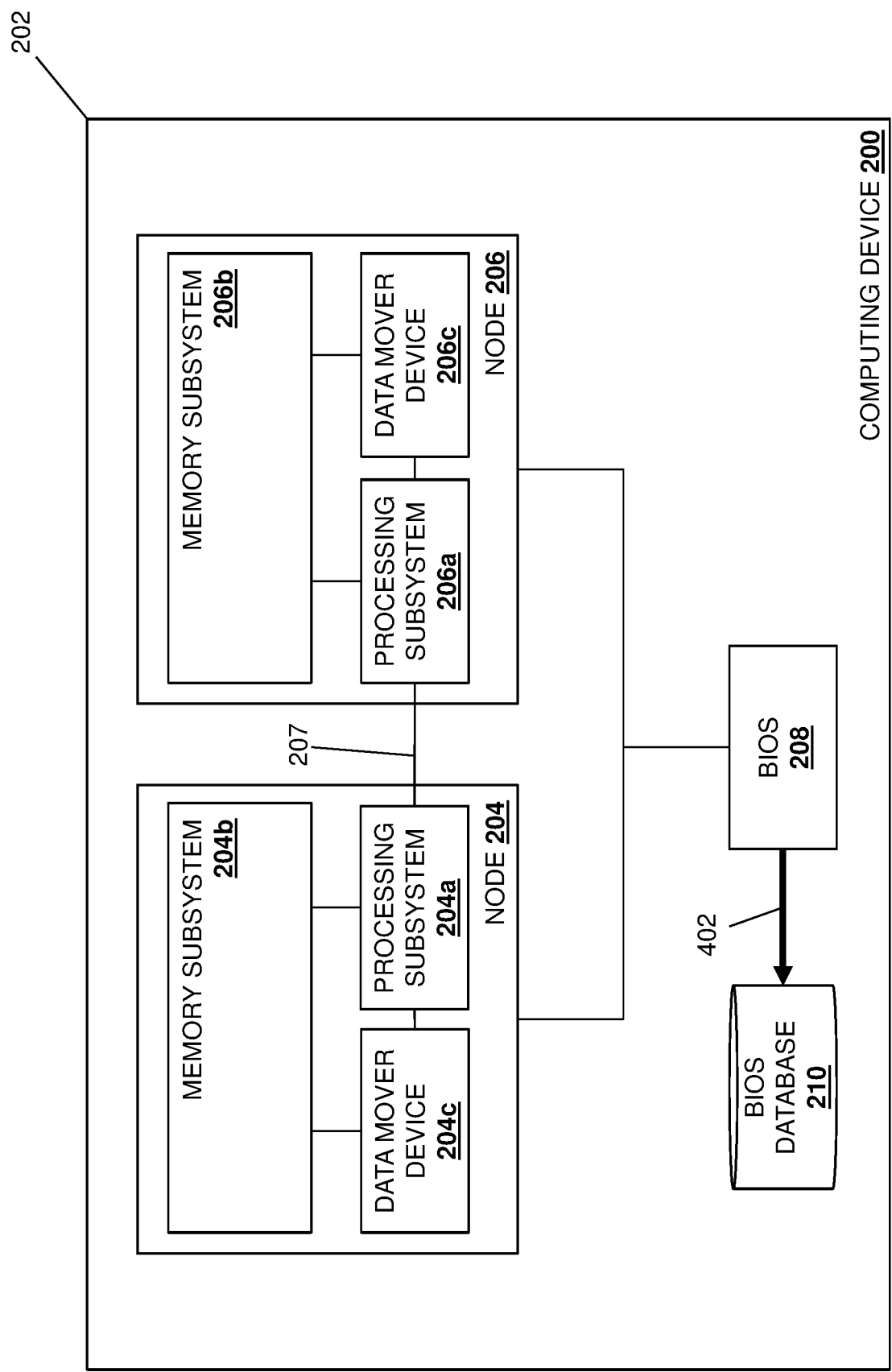
FIG. 4B is a schematic view illustrating an embodiment of the computing device of FIG. 2 operating during the method of FIG. 3.

The method 300 begins at block 302 where a BIOS generates a data mover selection table during initialization operations. In an embodiment, at block 302, a BIOS engine in the BIOS 208 may operate to generate a data mover selection table during, for example, initialization operations for the computing device 200. For example, with reference to FIG. 4A, the BIOS 208 may operate during boot operations for the computing device 200 to perform discovery operations 400 that provide for the discovery or other identification of the nodes 204 and 206, the processing subsystems 204a and 206a, the memory subsystems 204b and 206b, and/or the data mover devices 204c and 206c. In an embodiment, following the discovery operations, the BIOS engine in the BIOS 208 may operate to utilize the discovered information to generate a data mover selection table that may be provided by, for example, an Advanced Configuration and Power Interface (ACPI) construct. As illustrated in FIG. 4B, the BIOS 208 may then perform data mover selection table storage operations 402 to store the data mover selection table in the BIOS database 210.

With reference to FIG. 5, an embodiment of a data mover selection table 500 that may be generated and stored in BIOS database 210 at block 302. As will be appreciated by one of skill in the art in possession of the present disclosure, the BIOS engine in the BIOS 208 may generate the data mover selection table 500 that maps memory boundaries in the memory subsystems 204b and 206b to the data mover devices 204c and 206c based on an "affinity" or "distance" of the data mover devices to those memory boundaries, with data mover devices having higher "affinities"/smaller "distances" to particular memory subsystems prioritized for performing data transfers associated with those memory subsystems. As such, the specific example of the data mover selection table 500 corresponding to the computing device 200 illustrated in FIG. 2 maps memory locations to data mover devices by providing "source" memory location/address ranges in a first column in the data mover selection table 500, providing "destination" memory location/address ranges in a first row in the data mover selection table 500, and identifying the priority/priorities of the data mover devices 204c and/or 206c for data transfers between any particular combination of a source memory location/address and a destination memory location/address.

As such, with reference to the specific example provided in FIG. 5, for data transfers between a source memory location/address and a destination memory location/address that are both included in the memory location/address range of "0-0xFFF" that is provided by the memory subsystem 204b in this example, the data mover device 204c is identified as having priority for performing those data transfers due to the data mover device 204c being located in the node 204 with the memory subsystem 204b and, thus, having a higher "affinity"/smaller "distance" relative to that memory subsystem 204b that provides for more efficient data transfers (e.g., relative to data transfers performed by the data mover device 206c that is located in the node 206). Similarly, for data transfers between a source memory location/address and a destination memory location/address that are both included in the memory location/address range of "0x1000-0x1FFF" that is provided by the memory subsystem 204b in this example, the data mover device 204c is identified as having priority for performing those data transfers due to the data mover device 204c being located in the node 204 with the memory subsystem 204b and, thus, having a higher "affinity"/smaller "distance" relative to that memory subsystem 204b that provides for more efficient data transfers (e.g., relative to data transfers performed by the data mover device 206c that is located in the node 206).

Similarly, for data transfers between a source memory location/address that is included in the memory location/address range of "0-0xFFF" that is provided by the memory subsystem 204b in this example and a destination memory location/address that is included in the memory location/address range of "0x1000-0x1FFF" that is provided by the memory subsystem 204b in this example, the data mover device 204c is identified as having priority for performing those data transfers due to the data mover device 204c being located in the node 204 with the memory subsystem 204b and, thus, having a higher "affinity"/smaller "distance" relative to that memory subsystem 204b that provides for more efficient data transfers (e.g., relative to data transfers performed by the data mover device 206c that is located in the node 206). Similarly, for data transfers between a source memory location/address that is included in the memory location/address range of "0x1000-0x1FFF" that is provided by the memory subsystem 204b in this example and a destination memory location/address that is included in the memory location/address range of "0-0xFFF" that is provided by the memory subsystem 204b in this example, the data mover device 204c is identified as having priority for performing those data transfers due to the data mover device 204c being located in the node 204 with the memory subsystem 204b and, thus, having a higher "affinity"/smaller "distance" relative to that memory subsystem 204*b* that provides for more efficient data transfers (e.g., relative to data transfers performed by the data mover device 206*c* that is located in the node 206).

Similarly, for data transfers between a source memory location/address and a destination memory location/address that are both included in the memory location/address range of "0x2000-0x2FFF" that is provided by the memory subsystem 204*b* in this example, the data mover device 206*c* is identified as having priority for performing those data transfers due to the data mover device 206*c* being located in the node 206 with the memory subsystem 206*b* and, thus, having a higher "affinity"/smaller "distance" relative to that memory subsystem 206*b* that provides for more efficient data transfers (e.g., relative to data transfers performed by the data mover device 204*c* that is located in the node 204). Similarly, for data transfers between a source memory location/address and a destination memory location/address that are both included in the memory location/address range of "0x3000-0x3FFF" that is provided by the memory subsystem 206*b* in this example, the data mover device 206*c* is identified as having priority for performing those data transfers due to the data mover device 206*c* being located in the node 206 with the memory subsystem 206*b* and, thus, having a higher "affinity"/smaller "distance" relative to that memory subsystem 206*b* that provides for more efficient data transfers (e.g., relative to data transfers performed by the data mover device 204*c* that is located in the node 204).

Similarly, for data transfers between a source memory location/address that is included in the memory location/address range of "0x2000-0x2FFF" that is provided by the memory subsystem 206*b* in this example and a destination memory location/address that is included in the memory location/address range of "0x3000-0x3FFF" that is provided by the memory subsystem 206*b* in this example, the data mover device 206*c* is identified as having priority for performing those data transfers due to the data mover device 206*c* being located in the node 206 with the memory subsystem 206*b* and, thus, having a higher "affinity"/smaller "distance" relative to that memory subsystem 206*b* that provides for more efficient data transfers (e.g., relative to data transfers performed by the data mover device 204*c* that is located in the node 204). Similarly, for data transfers between a source memory location/address that is included in the memory location/address range of "0x3000-0x3FFF" that is provided by the memory subsystem 206*b* in this example and a destination memory location/address that is included in the memory location/address range of "0x2000-0x2FFF" that is provided by the memory subsystem 206*b* in this example, the data mover device 206*c* is identified as having priority for performing those data transfers due to the data mover device 206*c* being located in the node 206 with the memory subsystem 206*b* and, thus, having a higher "affinity"/smaller "distance" relative to that memory subsystem 206*b* that provides for more efficient data transfers (e.g., relative to data transfers performed by the data mover device 204*c* that is located in the node 204).

Similarly, for data transfers between a source memory location/address that is included in the memory location/address range of "0-0xFFF" that is provided by the memory subsystem 204*b* in this example and a destination memory location/address that is included in the memory location/address range of "0x2000-0x2FFF" that is provided by the memory subsystem 206*b* in this example, the data mover device 204*c* is identified as having first priority for performing those data transfers due to the data mover device 204*c* being located in the node 204 with the memory subsystem 204*b* that provides the source of the data for the data transfer and, thus, having a higher "affinity"/smaller "distance" relative to that memory subsystem 204*b* that provides for more efficient source data transfers (e.g., relative to source data transfers performed by the data mover device 206*c* that is located in the node 206). Furthermore, the data mover device 206*c* is identified as having second priority for performing those data transfers due to the data mover device 206*c* being located in the node 206 with the memory subsystem 206*b* that provides the destination of the data for the data transfer. As such, this embodiment of the present disclosure prioritizes data mover devices with a higher "affinity"/smaller "distance" relative to the memory subsystem that provides the source of the data for the data transfer over data mover devices with a higher "affinity"/smaller "distance" relative to the memory subsystem that provides the destination of the data for the data transfer.

Similarly, for data transfers between a source memory location/address that is included in the memory location/address range of "0-0xFFF" that is provided by the memory subsystem 204*b* in this example and a destination memory location/address that is included in the memory location/address range of "0x3000-0x3FFF" that is provided by the memory subsystem 206*b* in this example, the data mover device 204*c* is identified as having first priority for performing those data transfers due to the data mover device 204*c* being located in the node 204 with the memory subsystem 204*b* that provides the source of the data for the data transfer and, thus, having a higher "affinity"/smaller "distance" relative to that memory subsystem 204*b* that provides for more efficient source data transfers (e.g., relative to source data transfers performed by the data mover device 206*c* that is located in the node 206). Furthermore, the data mover device 206*c* is identified as having second priority for performing those data transfers due to the data mover device 206*c* being located in the node 206 with the memory subsystem 206*b* that provides the destination of the data for the data transfer. As such, this embodiment of the present disclosure prioritizes data mover devices with a higher "affinity"/smaller "distance" relative to the memory subsystem that provides the source of the data for the data transfer over data mover devices with a higher "affinity"/smaller "distance" relative to the memory subsystem that provides the destination of the data for the data transfer.

Similarly, for data transfers between a source memory location/address that is included in the memory location/address range of "0x1000-0x1FFF" that is provided by the memory subsystem 204*b* in this example and a destination memory location/address that is included in the memory location/address range of "0x2000-0x2FFF" that is provided by the memory subsystem 206*b* in this example, the data mover device 204*c* is identified as having first priority for performing those data transfers due to the data mover device 204*c* being located in the node 204 with the memory subsystem 204*b* that provides the source of the data for the data transfer and, thus, having a higher "affinity"/smaller "distance" relative to that memory subsystem 204*b* that provides for more efficient source data transfers (e.g., relative to source data transfers performed by the data mover device 206*c* that is located in the node 206). Furthermore, the data mover device 206*c* is identified as having second priority for performing those data transfers due to the data mover device 206*c* being located in the node 206 with the memory subsystem 206*b* that provides the destination of the data for the data transfer. As such, this embodiment of the present disclosure prioritizes data mover devices with a higher "affinity"/smaller "distance" relative to the memory subsystem that provides the source of the data for the data transfer over data mover devices with a higher "affinity"/ smaller "distance" relative to the memory subsystem that provides the destination of the data for the data transfer.

Similarly, for data transfers between a source memory location/address that is included in the memory location/ address range of "0x1000-0xF1FF" that is provided by the memory subsystem 204b in this example and a destination memory location/address that is included in the memory location/address range of "0x3000-0x3FFF" that is provided by the memory subsystem 206b in this example, the data mover device 204c is identified as having first priority for performing those data transfers due to the data mover device 204c being located in the node 204 with the memory subsystem 204b that provides the source of the data for the data transfer and, thus, having a higher "affinity"/smaller "distance" relative to that memory subsystem 204b that provides for more efficient source data transfers (e.g., relative to source data transfers performed by the data mover device 206c that is located in the node 206). Furthermore, the data mover device 206c is identified as having second priority for performing those data transfers due to the data mover device 206c being located in the node 206 with the memory subsystem 206b that provides the destination of the data for the data transfer. As such, this embodiment of the present disclosure prioritizes data mover devices with a higher "affinity"/smaller "distance" relative to the memory subsystem that provides the source of the data for the data transfer over data mover devices with a higher "affinity"/ smaller "distance" relative to the memory subsystem that provides the destination of the data for the data transfer.

Similarly, for data transfers between a source memory location/address that is included in the memory location/ address range of "0x2000-0x2FFF" that is provided by the memory subsystem 206b in this example and a destination memory location/address that is included in the memory location/address range of "0-0xFFF" that is provided by the memory subsystem 204b in this example, the data mover device 206c is identified as having first priority for performing those data transfers due to the data mover device 206c being located in the node 206 with the memory subsystem 206b that provides the source of the data for the data transfer and, thus, having a higher "affinity"/smaller "distance" relative to that memory subsystem 206b that provides for more efficient source data transfers (e.g., relative to source data transfers performed by the data mover device 204c that is located in the node 204). Furthermore, the data mover device 204c is identified as having second priority for performing those data transfers due to the data mover device 204c being located in the node 204 with the memory subsystem 204b that provides the destination of the data for the data transfer. As such, this embodiment of the present disclosure prioritizes data mover devices with a higher "affinity"/smaller "distance" relative to the memory subsystem that provides the source of the data for the data transfer over data mover devices with a higher "affinity"/smaller "distance" relative to the memory subsystem that provides the destination of the data for the data transfer.

Similarly, for data transfers between a source memory location/address that is included in the memory location/ address range of "0x2000-0x2FFF" that is provided by the memory subsystem 206b in this example and a destination memory location/address that is included in the memory location/address range of "0x1000-0x1FFF" that is provided by the memory subsystem 204b in this example, the data mover device 206c is identified as having first priority for performing those data transfers due to the data mover device 206c being located in the node 206 with the memory subsystem 206b that provides the source of the data for the data transfer and, thus, having a higher "affinity"/smaller "distance" relative to that memory subsystem 206b that provides for more efficient source data transfers (e.g., relative to source data transfers performed by the data mover device 204c that is located in the node 204). Furthermore, the data mover device 204c is identified as having second priority for performing those data transfers due to the data mover device 204c being located in the node 204 with the memory subsystem 204b that provides the destination of the data for the data transfer. As such, this embodiment of the present disclosure prioritizes data mover devices with a higher "affinity"/smaller "distance" relative to the memory subsystem that provides the source of the data for the data transfer over data mover devices with a higher "affinity"/smaller "distance" relative to the memory subsystem that provides the destination of the data for the data transfer.

Similarly, for data transfers between a source memory location/address that is included in the memory location/ address range of "0x3000-0x3FFF" that is provided by the memory subsystem 206b in this example and a destination memory location/address that is included in the memory location/address range of "0-0xFFF" that is provided by the memory subsystem 204b in this example, the data mover device 206c is identified as having first priority for performing those data transfers due to the data mover device 206c being located in the node 206 with the memory subsystem 206b that provides the source of the data for the data transfer and, thus, having a higher "affinity"/smaller "distance" relative to that memory subsystem 206b that provides for more efficient source data transfers (e.g., relative to source data transfers performed by the data mover device 204c that is located in the node 204). Furthermore, the data mover device 204c is identified as having second priority for performing those data transfers due to the data mover device 204c being located in the node 204 with the memory subsystem 204b that provides the destination of the data for the data transfer. As such, this embodiment of the present disclosure prioritizes data mover devices with a higher "affinity"/smaller "distance" relative to the memory subsystem that provides the source of the data for the data transfer over data mover devices with a higher "affinity"/smaller "distance" relative to the memory subsystem that provides the destination of the data for the data transfer.

Similarly, for data transfers between a source memory location/address that is included in the memory location/ address range of "0x3000-0x3FFF" that is provided by the memory subsystem 206b in this example and a destination memory location/address that is included in the memory location/address range of "0x1000-0x1FFF" that is provided by the memory subsystem 204b in this example, the data mover device 206c is identified as having first priority for performing those data transfers due to the data mover device 206c being located in the node 206 with the memory subsystem 206b that provides the source of the data for the data transfer and, thus, having a higher "affinity"/smaller "distance" relative to that memory subsystem 206b that provides for more efficient source data transfers (e.g., relative to source data transfers performed by the data mover device 204c that is located in the node 204). Furthermore, the data mover device 204c is identified as having second priority for performing those data transfers due to the data mover device 204c being located in the node 204 with the memory subsystem 204b that provides the destination of the data for the data transfer. As such, this embodiment of the present disclosure prioritizes data mover devices with a higher "affinity"/smaller "distance" relative to the memory subsystem that provides the source of the data for the data transfer over data mover devices with a higher "affinity"/smaller "distance" relative to the memory subsystem that provides the destination of the data for the data transfer.

However, while a specific example, of a data mover selection table 500 has been described for the specific configuration of the computing device 200 illustrated in FIG. 2, one of skill in the art in possession of the present disclosure will recognize that data mover selection tables may differ based on the configuration of the computing device for which they are generated (e.g., the number of nodes in the computing device, the location of the data mover devices, the memory subsystem and/or memory location/address ranges associated with the data mover devices, etc.), as well as based on a variety of other system features that will fall within the scope of the present disclosure as well. For example, while the specific data mover selection table 500 discussed above prioritizes data mover devices with a higher "affinity"/smaller "distance" relative to the memory subsystem that provides the source of the data for the data transfer over data mover devices with a higher "affinity"/smaller "distance" relative to the memory subsystem that provides the destination of the data for the data transfer, the prioritization of data mover devices with a higher "affinity"/smaller "distance" relative to the memory subsystem that provides the destination of the data for the data transfer over data mover devices with a higher "affinity"/smaller "distance" relative to the memory subsystem that provides the source of the data for the data transfer will fall within the scope of the present disclosure as well. Thus, data mover selection tables (and/or other techniques for providing for the selection of data mover devices according to the teachings of the present disclosure) may vary from the specific examples described herein while remaining within the scope of the present disclosure as well.

Furthermore, in some embodiments, the information in the data mover selection table 500 may be relatively static during runtime operations for the computing device 200 and following the initialization operations for the computing device 200. However, one of skill in the art in possession of the present disclosure will recognize how the data mover selection table 500 may be generated each time the computing device is initialized in order to, for example, allow for the movement of data mover devices (e.g., provided on a PCIe add-in card) to be reflected in the data mover selection table 500. As such, dynamic modification to the data mover selection table 500 across system boots (or during runtime in some examples) is envisioned as falling within the scope of the present disclosure.

Figure 6:
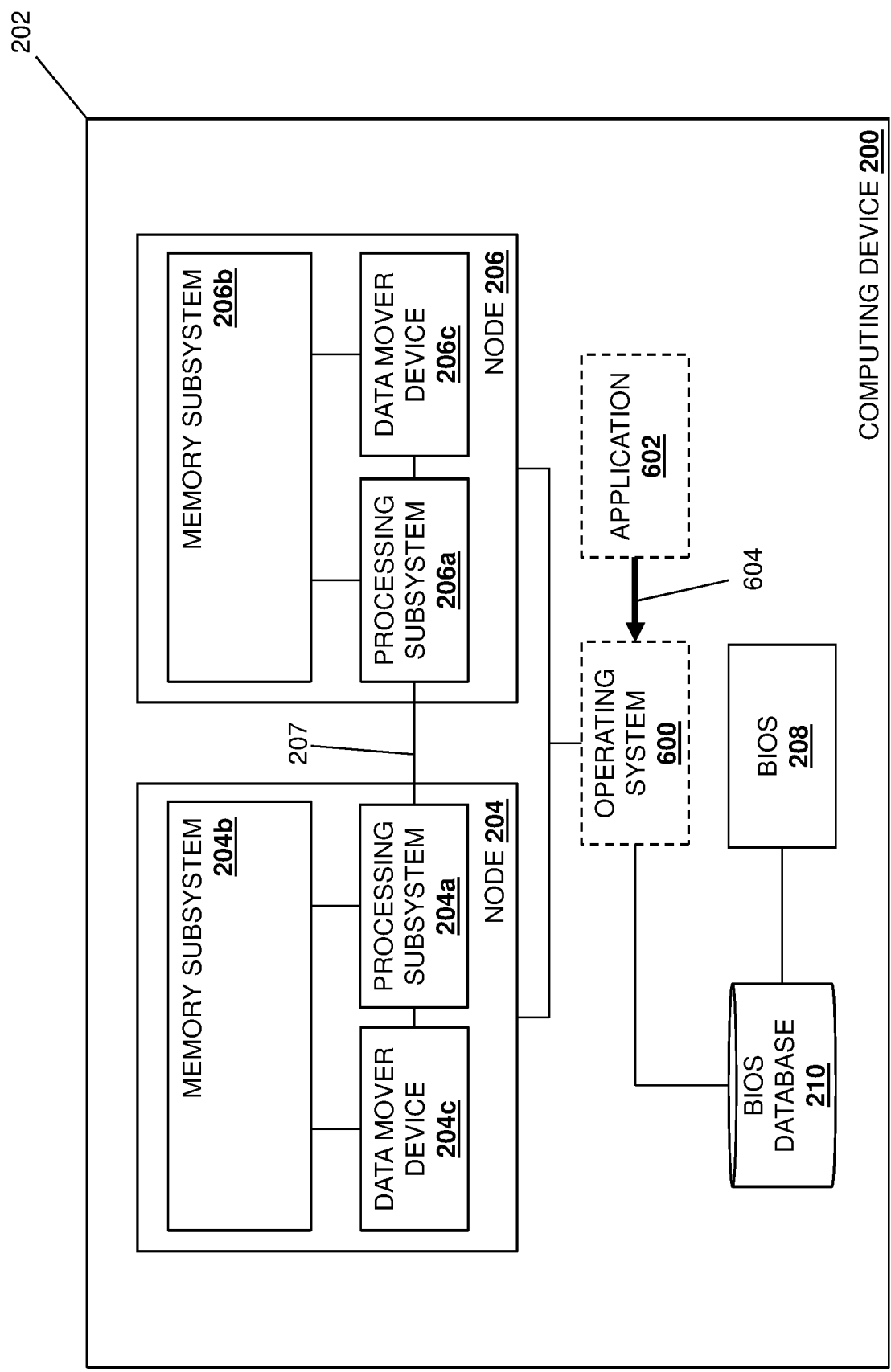
FIG. 6 is a schematic view illustrating an embodiment of the computing device of FIG. 2 operating during the method of FIG. 3.

The method 300 then proceeds to block 304 where an operating system determines that a data transfer operation provides for the transfer of data between memory locations. As illustrated in FIG. 6, in an embodiment of block 304, an operating system 600 and an application 602 may be provided by, for example, one or more of the processing subsystems 204*a* and 206*a* executing instructions stored on one or more of the memory subsystems 204*b* and 206*b*. As also illustrated in FIG. 6, at block 304, the application 602 may perform data transfer request operations 604 that may include, for example, a data transfer request that requests the performance of a data transfer between memory locations/addresses provided by the memory subsystem 204*b* and/or 206*b*. In a specific example, the operating system 600 may include an operating system driver that provides user-level abstraction for the querying of an operating system kernel in the operating system for data mover resources for data transfers and, thus, at block 304 the operating system driver may receive the data transfer request from the application 602.

Furthermore, one of skill in the art in possession of the present disclosure will recognize how the application 602 may query the operating system driver provided by the node to which the processing subsystems core(s)/thread(s) executing the application 602 are affinitized to. In other words, based on information received from the application 602, the operating system driver for the operating system 600 may identify the source address, destination address, and the size of memory block of data that needs to be moved in a memory transaction, and may present that information to the operating system kernel (i.e., the operating system driver may query the operating system kernel for which data mover to be use in the memory transaction, and the operating system kernel may then access the information provided in the data mover lookup table and return the data mover that the operating system driver should use for that memory transaction). However, while a specific configuration for providing data transfer operations to the operating system 600 has been described, one of skill in the art in possession of the present disclosure will appreciate that data transfer requests that request data transfers between memory locations may be provided to an operating system by a variety of components and in a variety of manners that will fall within the scope of the present disclosure as well.

Figure 7:
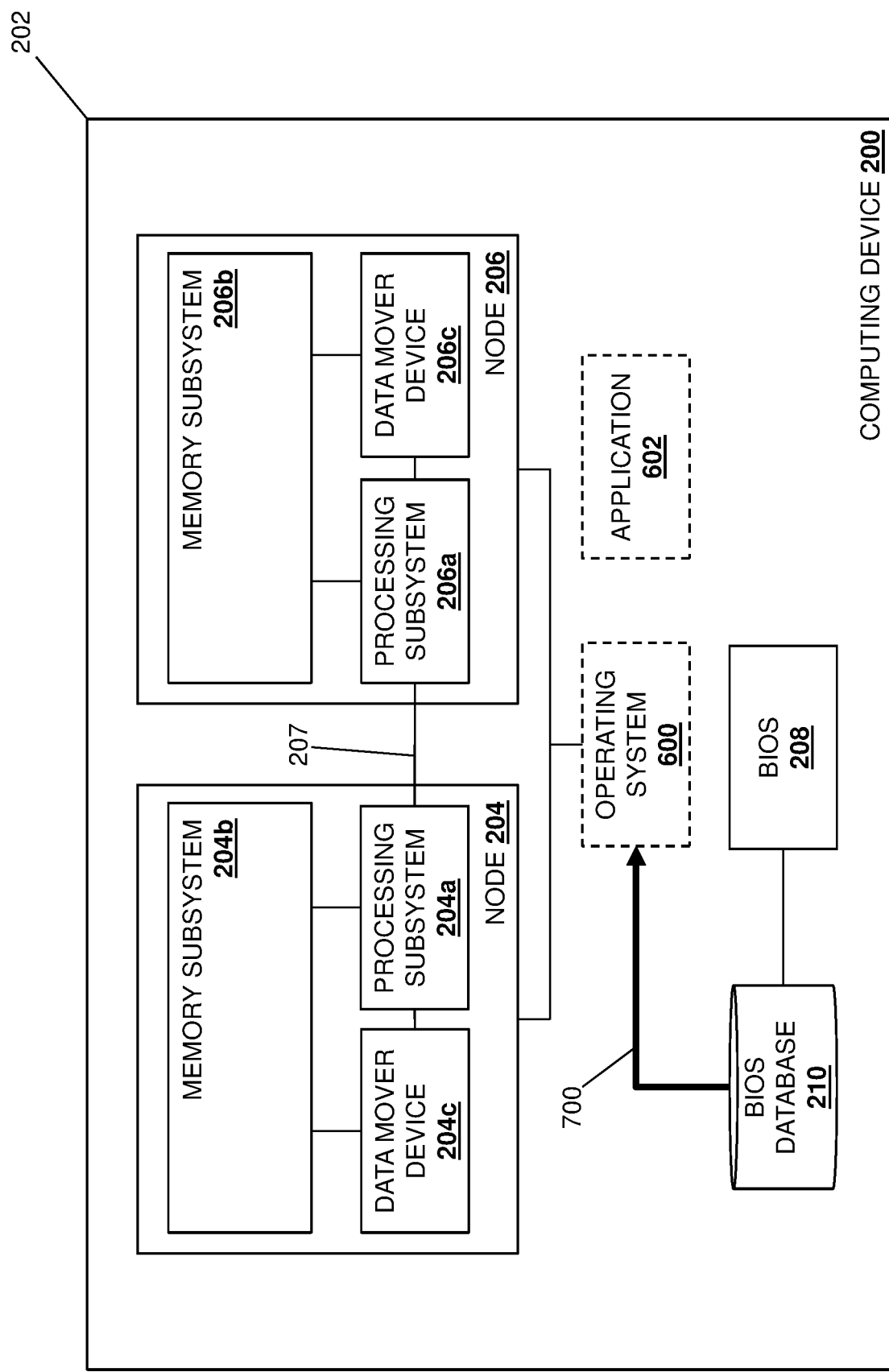
FIG. 7 is a schematic view illustrating an embodiment of the computing device of FIG. 2 operating during the method of FIG. 3.

The method 300 then proceeds to block 306 where the operating system identifies a data mover device in the data mover selection table with a highest priority for transferring data between the memory locations. With reference to FIG. 7, in an embodiment of block 306, the operating system 600 may operate to perform data mover selection operations 700 that include the accessing of the data mover selection table 500 stored in the BIOS database 210 and the selection of a data mover device for performing the data transfer operations determined at block 304. Continuing with the specific example discussed above, upon receiving the data transfer request from the application 602, the operating system driver in the operating system 600 may operate to send a data mover device selection request the operating system kernel in the operating system 600 to select a data mover device for performing the data transfer operation associated with the data transfer request, and the operating system kernel in the operating system 600 will operate to access the data mover selection table 500 in the BIOS database 210 in order to select a data mover device for performing the data transfer operations.

With reference to the data mover selection table 500 discussed above with reference to FIG. 5, at block 306 the operating system 600 may use the memory locations/addresses identified in the data transfer request to identify a data mover device for performing the data transfer operations. For example, if the source memory location/address falls in the range of "0-0xFFF" and the destination memory location/address falls in the range of "0x1000-0x1FFF", the operating system 600 may identify the data mover device 204*c* for performing the data transfer operations (i.e., because the data mover device 204*c* is the only data mover device identified/prioritized for performing data transfers between those memory locations/addresses). In another example, if the source memory location/address falls in the range of "0x1000-0x1FFF" and the destination memory location/address falls in the range of "0x2000-0x2FFF", the operating system 600 may identify the data mover device 204*c* for performing the data transfer operations (i.e., because the data mover device 204*c* is prioritized over the data mover device 206c for performing data transfers between those memory locations/addresses). In another example, if the source memory location/address falls in the range of "0x3000-0x3FFF" and the destination memory location/address falls in the range of "0-0xFFF", the operating system 600 may identify the data mover device 206c for performing the data transfer operations (i.e., because the data mover device 206c is prioritized over the data mover device 204c for performing data transfers between those memory locations/addresses). Similarly, if the source memory location/address falls in the range of "0x2000-0x2FFF" and the destination memory location/address falls in the range of "0x3000-0x3FFF", the operating system 600 may identify the data mover device 206c for performing the data transfer operations (i.e., because the data mover device 206c is the only data mover device identified/prioritized for performing data transfers between those memory locations/addresses).

As such, one of skill in the art in possession of the present disclosure will appreciate how the data mover selection table 500 allows the operating system 600 to select, for any data transfer request that provides for the transfer of data between memory locations, a data mover device that is configured to perform the most efficient data transfer between those memory locations (e.g., based on that data mover device having the highest "affinity"/smallest "distance" relative to one or more of those memory locations, and/or on other factors that would be apparent to one of skill in the art in possession of the present disclosure.) However, while a specific data mover selection table has been described as being utilized to select a data mover device for a data transfer operation based on particular data transfer efficiency characteristics, one of skill in the art in possession of the present disclosure will recognize that the selection of a data mover device for performing a data transfer operation in other manners and/or based on other data mover device selection characteristics will fall within the scope of the present disclosure as well.

The method 300 then proceeds to decision block 308 where it is determined whether the identified data mover device exceeds a data transfer operation threshold. In an embodiment, at decision block 308, the operating system 600 may operate to determine whether the data mover device selected at block 306 is currently operating such that it exceeds a data transfer operation threshold. As will be appreciated by one of skill in the art in possession of the present disclosure, any data mover device selected at block 306 may already be performing one or more data transfer operations, and the data mover selection system of the present disclosure may define a data transfer operation threshold above which a data mover device should not be utilized to perform a requested data transfer operation (i.e., despite its selection/ident cation at block 306). As such, for any data mover device selection/identification at block 306, the operating system 600 may perform a check to determine the operating level of that data mover device in order to ensure that data mover device will not be overloaded if it performs the data transfer operations determined at block 304.

If, at decision block 308, it is determined that the identified data mover device exceeds the data transfer operation threshold, the method 300 proceeds to block 310 where the identified data mover device is ignored. In an embodiment, at block 310 and in response to determining that the identified data mover device exceeds the data transfer operation threshold, the operating system 600 may operate to ignore that data mover device and the method 300 will return to block 306. As such, in the event a data mover device is selected at block 306 and determined to exceed the data transfer operation threshold at block 308 of a first iteration of the method 300, that data mover device will be ignored at block 310, and a different data mover device will be selected at block 306 of second iteration of the method 300. Thus, one of skill in the art in possession of the present disclosure will recognize how the method 300 may loop through blocks 306, 308, and 310 until a data mover device is selected/identified that does not exceed the data transfer operation threshold. As such, following any iteration of the method 300 in which a data mover device is identified that exceeds the data transfer threshold, the next "best" data mover device may be identified until a data mover device is identified that does not exceed the data transfer threshold. One of skill in the art in possession of the present disclosure will appreciate that, in some embodiments, changing data transfer operations by a data mover device may result in the same data mover device that was identified in a previous iteration of the method 300 being identified in a subsequent iteration of the method 300. Furthermore, rather than perform the iterative process discussed above, in the event a data mover is identified that exceeds the data transfer threshold, the method 300 may simply operate to identify the next "best" data mover device and proceed to block 312, discussed in further detail below.

In a specific example, at block 306 on a first iteration of the method 300, the data mover device 206c may have been identified by the operating system 600 as having first priority for performing data transfers between a source memory location/address that is included in the memory location/address range of "0x3000-0x3FFF" that is provided by the memory subsystem 206b in this example and a destination memory location/address that is included in the memory location/address range of "0x1000-0x1FFF" that is provided by the memory subsystem 204b in this example (i.e., due to the data mover device 206c being located in the node 206 with the memory subsystem 206b that provides the source of the data for the data transfer and, thus, having a higher "affinity"/smaller "distance" relative to that memory subsystem 206b that provides for more efficient source data transfers relative to source data transfers performed by the data mover device 204c that is located in the node 204). At decision block 308, the operating system 600 may determine that the data mover device 206c exceeds the data transfer operation threshold and, in response, the operating system 600 will operate to ignore the data mover device 206c at block 310. Subsequently, at block 306 on a second iteration of the method 300, the data mover device 204c will be identified by the operating system 600 as having second (and now highest) priority for performing those data transfers (i.e., due to the data mover device 204c being located in the node 204 with the memory subsystem 204b that provides the destination of the data for the data transfer.)

As such, the prioritization of the data mover devices in the data mover selection table 500 allows lower priority data mover devices to be selected over higher priority data mover devices in the event the higher priority data mover devices exceed the data transfer operation threshold. As will be appreciated by one of skill in the art in possession of the present disclosure, in some embodiments and in the event only a single data mover device is identified for performing data transfers between different memory location/address ranges (e.g., the data mover device 204c identified for performing data transfers between the source memory range "0-0xFFF" and the destination memory range "0x1000-0x1FFF" in the data mover selection table 500), that data mover device may be selected/identified for performing the data transfer operations despite the fact that it exceeds the data transfer operation threshold. However, in other embodiments and in the event only a single data mover device is identified for performing data transfers between different memory location/address ranges (e.g., the data mover device 206c identified for performing data transfers between the source memory range "0x3000-0x3FFF" and the destination memory range "0x3000-0x3FFF" in the data mover selection table 500), the operating system 600 may select and/or identify a different data mover device for performing the data transfer operations in the event the data mover device identified in the data mover selection table 500 exceeds the data transfer operation threshold. As such, one of skill in the art in possession of the present disclosure will recognize that the data transfer operation threshold may be used to prevent the overloading of data mover devices in a variety of manners that will fall within the scope of the present disclosure as well.

Figure 8:
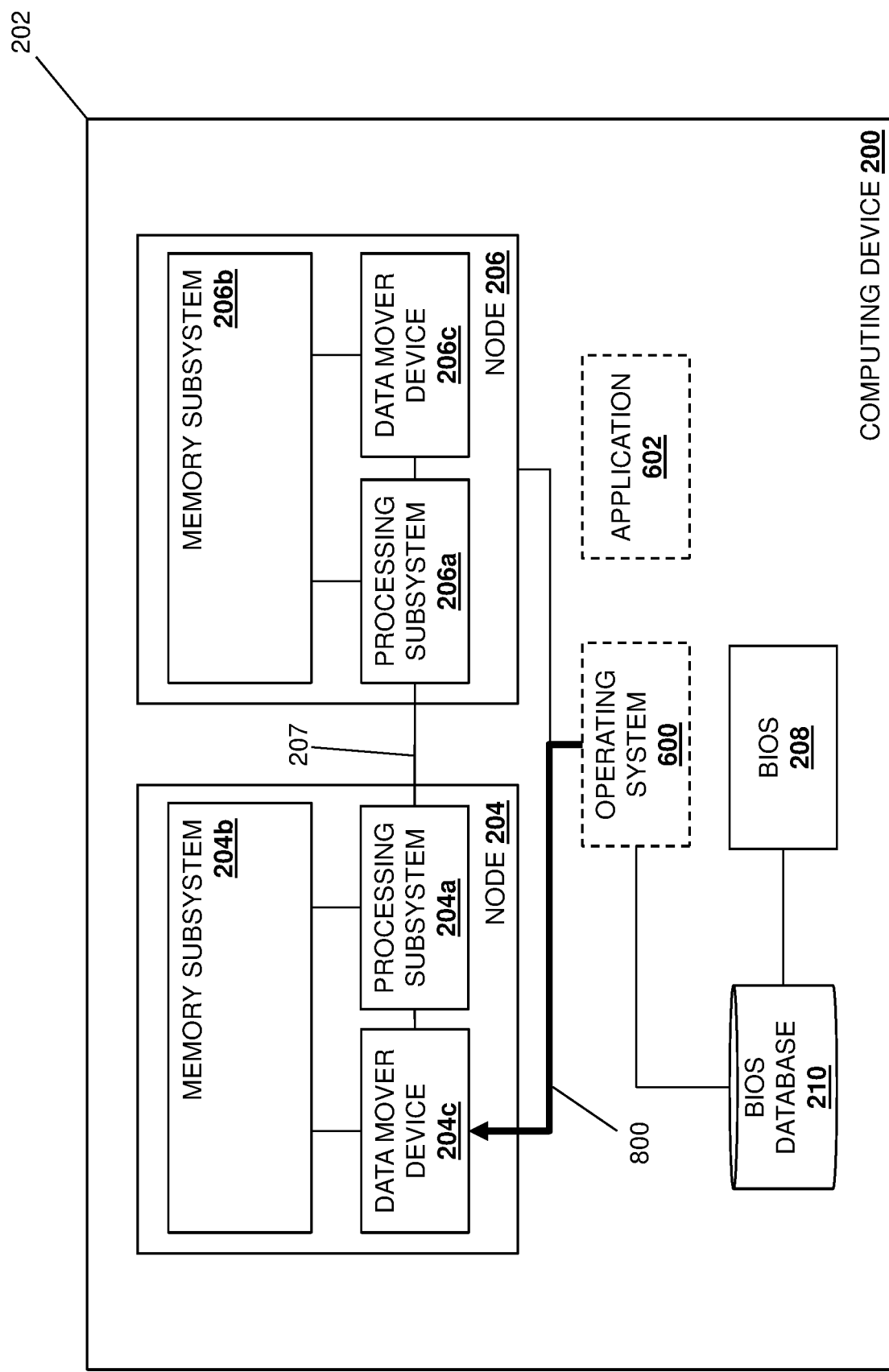
FIG. 8 is a schematic view illustrating an embodiment of the computing device of FIG. 2 operating during the method of FIG. 3.
Figure 11:
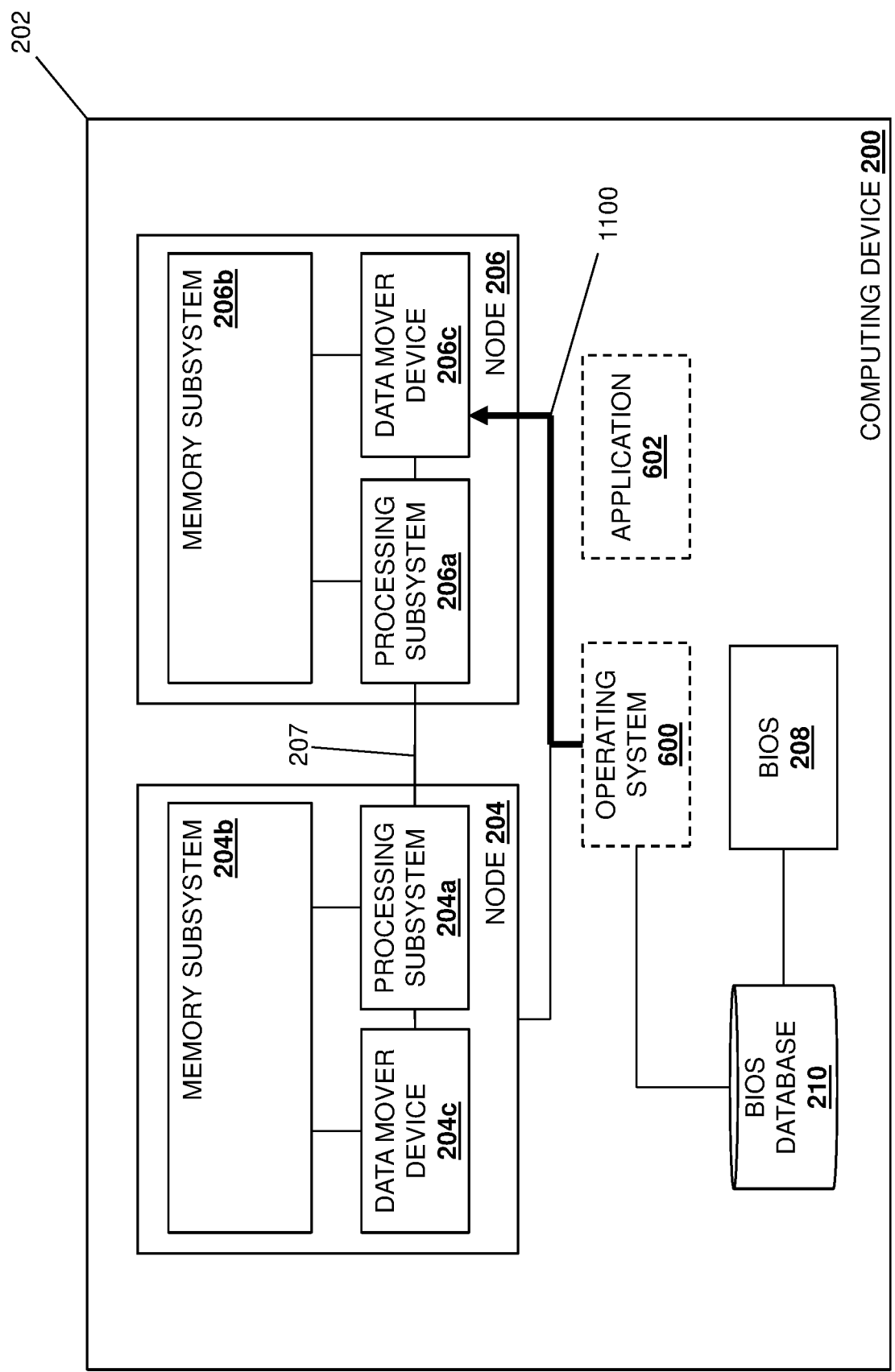
FIG. 11 is a schematic view illustrating an embodiment of the computing device of FIG. 2 operating during the method of FIG. 3.

If at decision block 308, it is determined that the identified data mover device does not exceed the data transfer operation threshold, the method 300 proceeds to block 312 where the operating system transmits a data transfer instruction to the identified data mover device. With reference to FIG. 8, in an embodiment of block 312 and in response to the selection/identification of the data mover device 204c at block 306, the operating system 600 may perform data transfer instruction operations 800 to transfer a data transfer instruction to the data mover device 204c. With reference to FIG. 11, in an embodiment of block 312 and in response to the selection/identification of the data mover device 206c at block 306, the operating system 600 may perform data transfer instruction operations 1100 to transfer a data transfer instruction to the data mover device 206c. However, while specific examples are provided, as discussed below data mover devices may be provided in different configurations and/or locations within the computing device 200, and thus the transmission of data transfer instructions to any of those data mover devices will fall within the scope of the present disclosure as well.

Figure 9:
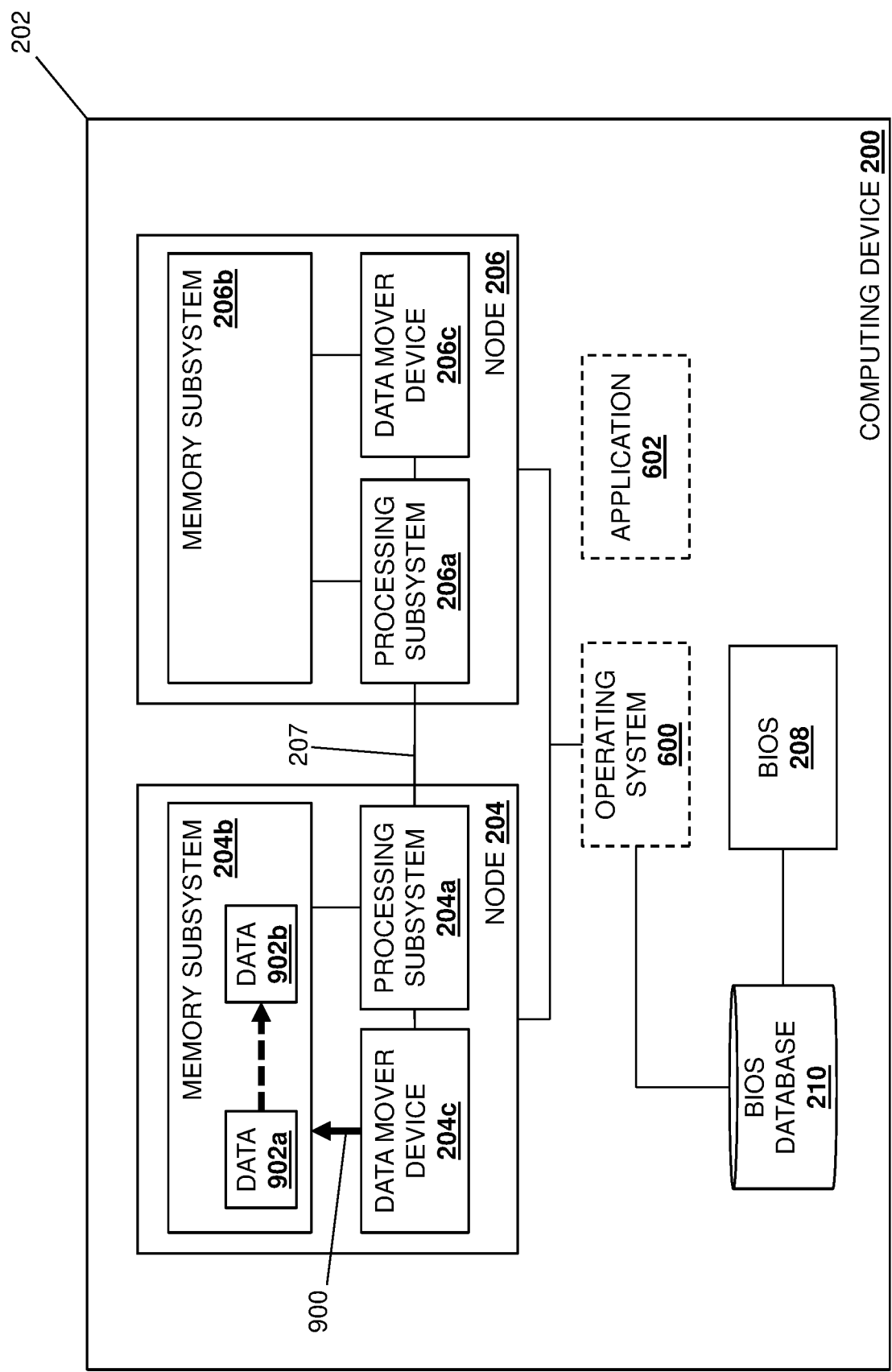
FIG. 9 is a schematic view illustrating an embodiment of the computing device of FIG. 2 operating during the method of FIG. 3.

The method 300 then proceeds to block 314 where the identified data mover device transfers data between the memory locations. With reference to FIG. 9, in an embodiment of block 314, the data mover device 204c may receive the data transfer instructions as part of the data transfer instruction operations 800 from the operating system 600 and, in response, perform data transfer operations 900 included in those data transfer instructions. In this example, the data transfer instructions instruct the transfer of data between a source memory location/address included in the memory location/address range "0-0xFFF" provided by the memory subsystem 204b, and a destination memory location/address included in the memory location/address range "0x1000-0x1FFF" provided by the memory subsystem 204b, and the data transfer operations 900 provide for the transfer of data from a data location 902a in the memory subsystem 204b (included in the memory location/address range "0-0x1 FFF") to a data location 902b in the memory subsystem 204b (included in the memory location/address range "0x1000-0x1FFF"). As will be appreciated by one of skill in the art in possession of the present disclosure, following the data transfer operations 900, the data mover device 204c may provide a data transfer confirmation to the operating system 600, and the operating system 600 may provide a data transfer confirmation to the application 602.

Figure 10:
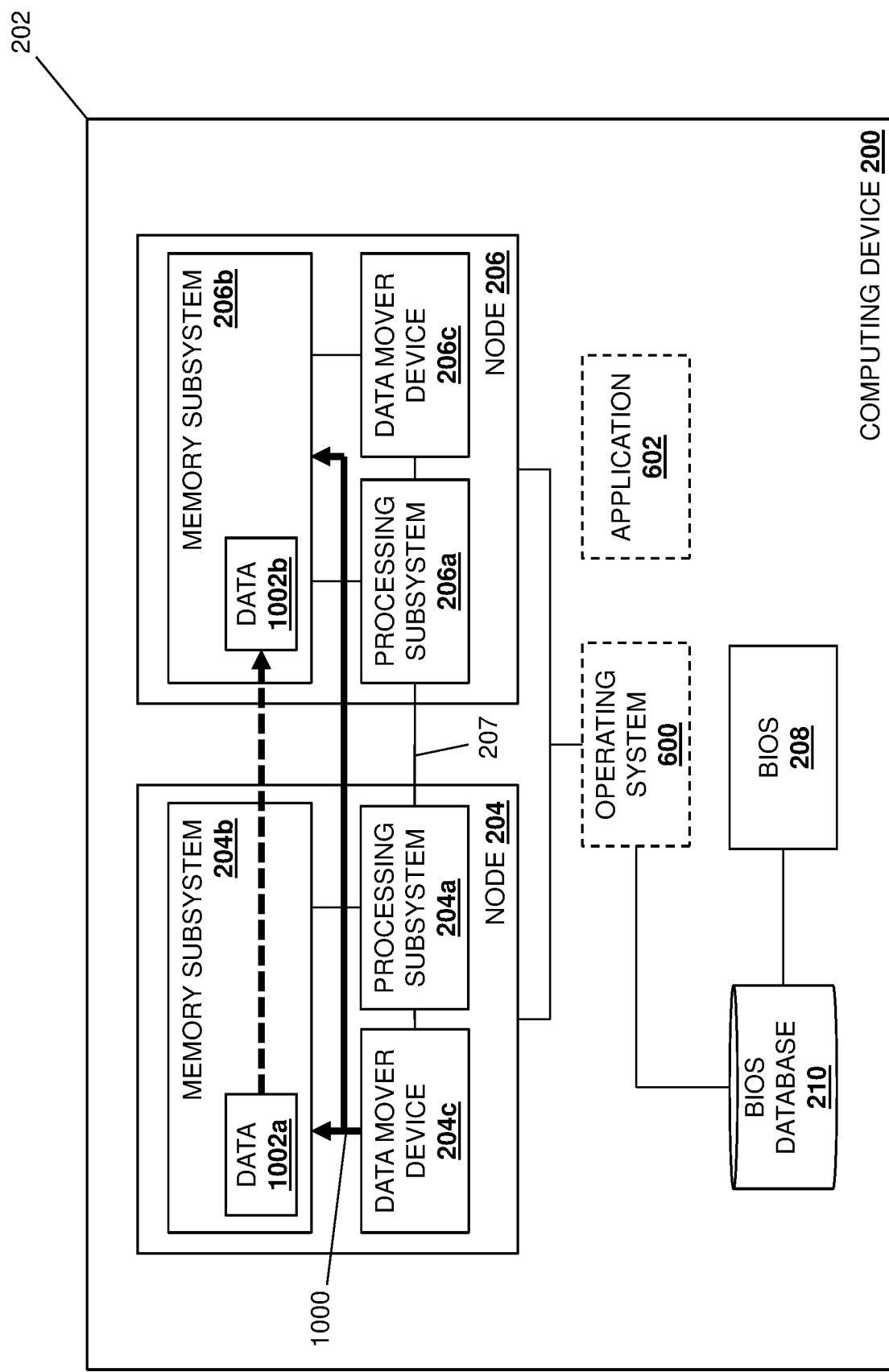
FIG. 10 is a schematic view illustrating an embodiment of the computing device of FIG. 2 operating during the method of FIG. 3.

With reference to FIG. 10, in an embodiment of block 314, the data mover device 204c may receive the data transfer instructions as part of the data transfer instruction operations 800 from the operating system 600 and, in response, perform data transfer operations 1000 included in those data transfer instructions. In this example, the data transfer instructions instruct the transfer of data between a source memory location/address included in the memory location/address range "0x1000-0x1FFF" provided by the memory subsystem 204b, and a destination memory location/address included in the memory location/address range "0x2000-0x2FFF" provided by the memory subsystem 206b, and the data transfer operations 1000 provide for the transfer of data from a data location 1002a in the memory subsystem 204b (included in the memory location/address range "0x1000-0x1FFF") to a data location 1002b in the memory subsystem 206b (included in the memory location/address range "0x2000-0x2FFF"). As will be appreciated by one of skill in the art in possession of the present disclosure, following the data transfer operations 1000, the data mover device 204c may provide a data transfer confirmation to the operating system 600, and the operating system 600 may provide a data transfer confirmation to the application 602.

Figure 12:
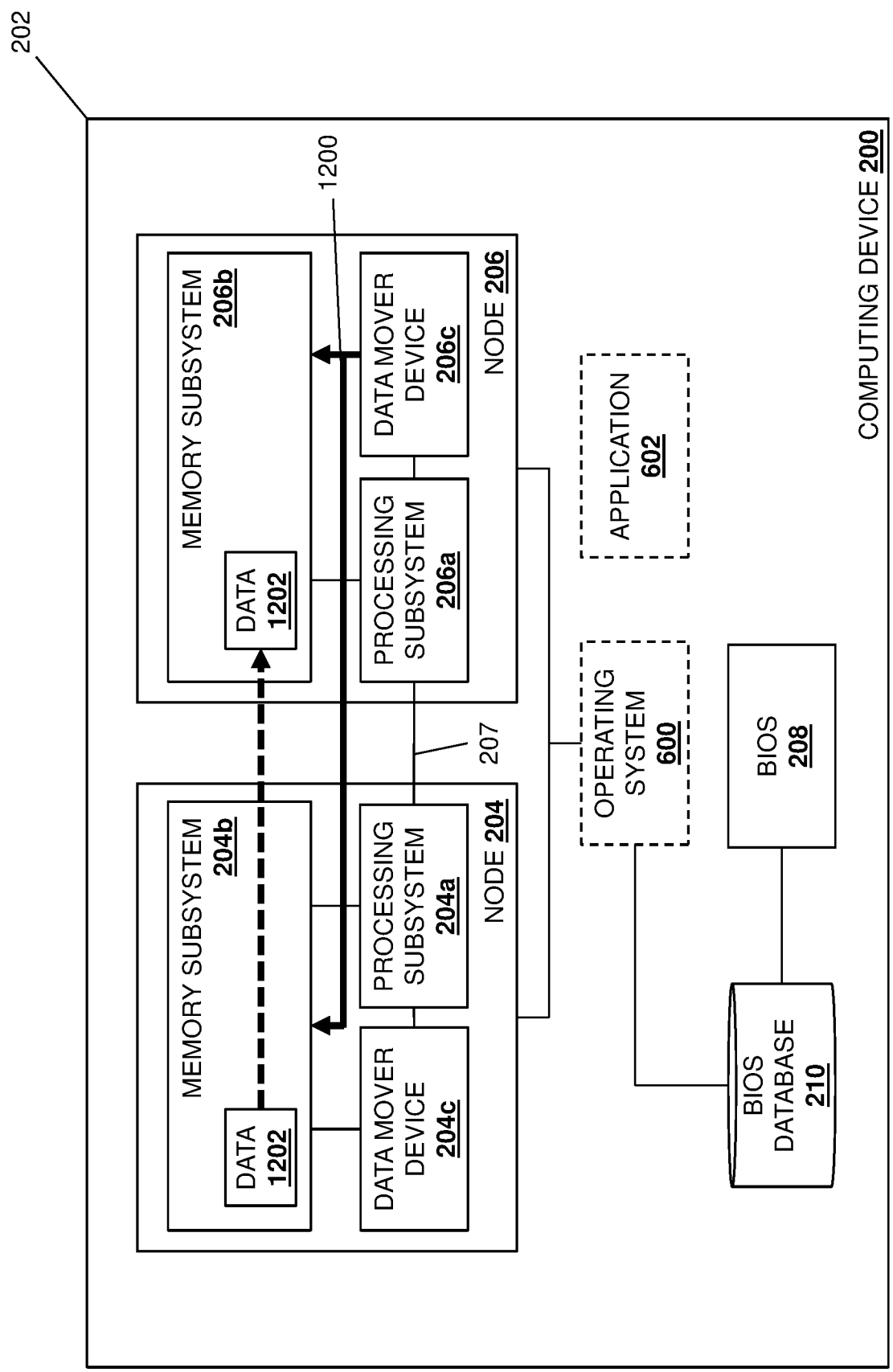
FIG. 12 is a schematic view illustrating an embodiment of the computing device of FIG. 2 operating during the method of FIG. 3.

With reference to FIG. 12, in an embodiment of block 314, the data mover device 206c may receive the data transfer instructions as part of the data transfer instruction operations 1100 from the operating system 600 and, in response, perform data transfer operations 1200 included in those data transfer instructions. In this example, the data transfer instructions instruct the transfer of data between a source memory location/address included in the memory location/address range "0-0xFFF" provided by the memory subsystem 204b, and a destination memory location/address included in the memory location/address range "0x3000-0x3FFF" provided by the memory subsystem 206b, and the data transfer operations 1200 provide for the transfer of data from a data location 1202a in the memory subsystem 204b (included in the memory location/address range "0-0xFFF") to a data location 1202b in the memory subsystem 206b (included in the memory location/address range "0x3000-0x3FFF"). As will be appreciated by one of skill in the art in possession of the present disclosure, following the data transfer operations 1200, the data mover device 206c may provide a data transfer confirmation to the operating system 600, and the operating system 600 may provide a data transfer confirmation to the application 602.

Thus, systems and methods have been described that provide for the selection of one of a plurality of data mover devices for which to perform data transfer operations between memory locations provided in one or more NUMA nodes based on an "affinity" of that data mover device to at least one of those memory locations that provides that data mover device a higher priority for performing the data transfer that the other data mover devices. For example, the data mover selection system of the present disclosure may include a first data mover device and a second data mover device that are both coupled to a memory system provided by a plurality of NUMA nodes, and an operating system that is coupled to the first data mover device and the second data mover device. The operating system determines that a first data transfer operation provides for the transfer of data from a first memory location in the memory system provided by the plurality of NUMA nodes to a second memory location in the memory system provided by the plurality of NUMA nodes, identifies the first data mover device for performing the first data transfer operation based on the first data mover device having a higher priority relative to the second data mover device for performing data transfers from the first memory location in the memory system provided by the plurality of NUMA nodes to the second memory location in the memory system provided by the plurality of NUMA nodes and, in response, transmits a first data transfer instruction to the first data mover device that is configured to cause the first data mover device to perform the first data transfer operation to transfer data from the first memory location in the memory system provided by the plurality of NUMA nodes to the second memory location in the memory system provided by the plurality of NUMA nodes. As such, more efficient data transfers may be performed by data mover devices (relative to conventional "round robin" data mover device selections) based on their affinity to one or more of the memory locations involved in those data transfers.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A data mover selection system, comprising:
   a first node including a first processing subsystem and a first memory subsystem;
   a first data mover device that is included in the first node, coupled to the first memory subsystem, and configured to offload data transfer operations from the first processing subsystem;
   a second node including a second processing subsystem and a second memory subsystem;
   a second data mover device that is included in the second node, coupled to the second memory subsystem, and configured to offload data transfer operations from the second processing subsystem; and
   a Basic Input/Output System (BIOS) that is coupled to the first node and the second node, wherein the BIOS is configured to:
      discover, during a first initialization process, the first data mover device and the second data mover device; and
      generate, during the first initialization process, a first data mover selection table based on the first data mover device, the second data mover device, the first memory subsystem, and the second memory subsystem;
   an operating system that is coupled to the first node and the second node, wherein the operating system is configured to:
      determine that a first data transfer operation provides for the transfer of data from a first memory location in one of the first memory subsystem and the second memory subsystem to a second memory location in one of the first memory subsystem and the second memory subsystem;
      identify, using the first data mover selection table, the first data mover device for performing the first data transfer operation based on the first data mover device having a higher priority relative to the second data mover device for performing data transfers from the first memory location to the second memory location; and
      transmit, in response to identifying the first data mover device for performing the first data transfer operation, a first data transfer instruction to the first data mover device that is configured to cause the first data mover device to perform the first data transfer operation to transfer data from the first memory location to the second memory location.

2. The system of claim 1, wherein the operating system is configured to:
   determine that a second data transfer operation provides for the transfer of data from a third memory location in one of the first memory subsystem and the second memory subsystem to a fourth memory location in one of the first memory subsystem and the second memory subsystem;
   identify, using the first data mover selection table, the first data mover device for performing the second data transfer operation based on the first data mover device having the higher priority relative to the second data mover device for performing data transfers from the third memory location to the fourth memory location;
   determine that the first data mover device is exceeding a data transfer operation threshold; and
   transmit, in response to determining that the first data mover device is exceeding the data transfer operation threshold, a second data transfer instruction to the second data mover device that is configured to cause the second data mover device to perform the second data transfer operation to transfer data from the third memory location to the fourth memory location.

3. The system of claim 1, wherein the first node is a first Non-Uniform Memory Access (NUMA) node and the second node is a second NUMA node.

4. The system of claim 1, wherein the identifying the first data mover device for performing the first data transfer operation based on the first data mover device having the higher priority relative to the second data mover device for performing data transfers from the first memory location to the second memory location includes:
   accessing the first data mover selection table that identifies relative distances of the first data mover device and the second data mover device to each of the first memory location and the second memory location.

5. The system of claim 1, wherein the first data mover device has the higher priority relative to the second data mover device for performing data transfers from the first memory location to the second memory location based on the first data mover device being configured to provide faster data transfers from the first memory location relative to the second data mover device, while the second data mover device is configured to provide faster data transfers from the second memory location relative to the first data mover device.

6. The system of claim 1,
   wherein the BIOS is configured to:
   discover, during a second initialization process that is subsequent to the first initialization process, the first data mover device and a third data mover device; and
   generate, during the second initialization process, a second data mover selection table that is different than the first data mover selection table and that is based on the first data mover device, the third data mover device, the first memory subsystem, and the second memory subsystem,
   wherein the operating system is configured to:
      determine that a second data transfer operation provides for the transfer of data from a third memory location in one of the first memory subsystem and the second memory subsystem to a fourth memory location in one of the first memory subsystem and the second memory subsystem;

identify, using the second data mover selection table, the third data mover device for performing the second data transfer operation based on the third data mover device having the higher priority relative to the first data mover device for performing data transfers from the third memory location to the fourth memory location; and transmit, in response to identifying the third data mover device for performing the second data transfer operation, a second data transfer instruction to the third data mover device that is configured to cause the third data mover device to perform the second data transfer operation to transfer data from the third memory location to the fourth memory location.

7. An Information Handling System (IHS), comprising:
a processing system provided by:
  a first node having a first processing subsystem; and
  a second node having a second processing subsystem;
a memory system provided by:
a first memory subsystem that is included in the first node; and
a second memory subsystem that is included in the second node,
wherein the memory system is coupled to the processing system and includes instructions that, when executed by the processing system, cause the processing system to provide:
a Basic Input/Output System (BIOS) that is configured to:
  discover, during a first initialization process, a first data mover device that is included in the first node and configured to offload data transfer operations from the first processing subsystem, and a second data mover device that is included in the second node and configured to offload data transfer operations from the second processing subsystem; and
  generate, during the first initialization process, a first data mover selection table based on the first data mover device, the second data mover device, the first memory subsystem, and the second memory subsystem;
an operating system engine that is configured to:
  determine that a first data transfer operation provides for the transfer of data from a first memory location in one of the first memory subsystem and the second memory subsystem to a second memory location in one of the first memory subsystem and the second memory subsystem;
  identify, using the first data mover selection table, a first data mover device for performing the first data transfer operation based on the first data mover device having a higher priority relative to a second data mover device for performing data transfers from the first memory location to the second memory location; and
  transmit, in response to identifying the first data mover device for performing the first data transfer operation, a first data transfer instruction to the first data mover device that is configured to cause the first data mover device to perform the first data transfer operation to transfer data from the first memory location to the second memory location.

8. The IHS of claim 7, wherein the operating system is configured to:
determine that a second data transfer operation provides for the transfer of data from a third memory location in one of the first memory subsystem and the second memory subsystem to a fourth memory location in one of the first memory subsystem and the second memory subsystem;
identify, using the first data mover selection table, the first data mover device for performing the second data transfer operation based on the first data mover device having the higher priority relative to the second data mover device for performing data transfers from the third memory location to the fourth memory location;
determine that the first data mover device is exceeding a data transfer operation threshold; and
transmit, in response to determining that the first data mover device is exceeding the data transfer operation threshold, a second data transfer instruction to the second data mover device that is configured to cause the second data mover device to perform the second data transfer operation to transfer data from the third memory location to the fourth memory location.

9. The IHS of claim 7, wherein the first node is a first Non-Uniform Memory Access (NUMA) node and the second node is a second NUMA node.

10. The IHS of claim 7, wherein the identifying the first data mover device for performing the first data transfer operation based on the first data mover device having the higher priority relative to the second data mover device for performing data transfers from the first memory location to the second memory location includes:
  accessing the first data mover selection table that identifies relative distances of the first data mover device and the second data mover device to each of the first memory location and the second memory location.

11. The IHS of claim 7, wherein the first data mover device has the higher priority relative to the second data mover device for performing data transfers from the first memory location to the second memory location based on the first data mover device being configured to provide faster data transfers from the first memory location relative to the second data mover device, while the second data mover device is configured to provide faster data transfers from the second memory location relative to the first data mover device.

12. The IHS of claim 7, wherein the BIOS is configured to:
discover, during a second initialization process that is subsequent to the first initialization process, the first data mover device and a third data mover device; and
generate, during the second initialization process, a second data mover selection table that is different than the first data mover selection table and that is based on the first data mover device, the third data mover device, the first memory subsystem, and the second memory subsystem,
wherein the operating system is configured to:
  determine that a second data transfer operation provides for the transfer of data from a third memory location in one of the first memory subsystem and the second memory subsystem to a fourth memory location in one of the first memory subsystem and the second memory subsystem;
  identify, using the second data mover selection table, the third data mover device for performing the second data transfer operation based on the third data mover device having the higher priority relative to the first data mover device for performing data transfers from the third memory location to the fourth memory location; and transmit, in response to identifying the third data mover device for performing the second data transfer operation, a second data transfer instruction to the third data mover device that is configured to cause the third data mover device to perform the second data transfer operation to transfer data from the third memory location to the fourth memory location.

13. The IHS of claim 7, wherein the operating system is configured to:
determine that a second data transfer operation provides for the transfer of data from a third memory location in one of the first memory subsystem and the second memory subsystem to a fourth memory location in one of the first memory subsystem and the second memory subsystem;
identify a third data mover device for performing the second data transfer operation based on the third data mover device having a higher priority relative to the first data mover device and the second data mover device for performing data transfers from the third memory location to the fourth memory location; and
transmit, in response to identifying the third data mover device for performing the second data transfer operation, a second data transfer instruction to the third data mover device that is configured to cause the third data mover device to perform the second data transfer operation to transfer data from the third memory location to the fourth memory location.

14. A method for selecting a data mover device comprising:
discovering, by a Basic Input/Output System (BIOS) provided by a computing device during a first initialization process:
a first data mover device that is included in a first node having a first processing subsystem and a first memory subsystem, wherein the first data mover device is configured to offload data transfer operations from the first processing subsystem; and
a second data mover device that is included in a second node having a second processing subsystem and a second memory subsystem, wherein the second data mover device is configured to offload data transfer operations from the second processing subsystem;
generating, by the BIOS provided by the computing device during the first initialization process, a first data mover selection table based on the first data mover device, the second data mover device, the first memory subsystem, and the second memory subsystem;
determining, by an operating system provided by the computing device, that a first data transfer operation provides for the transfer of data from a first memory location in one of the first memory subsystem and the second memory subsystem to a second memory location in one of the first memory subsystem and the second memory subsystem;
identifying, by the operating system provided by the computing device using the first data mover selection table, a first data mover device for performing the first data transfer operation based on the first data mover device having a higher priority relative to a second data mover device for performing data transfers from the first memory location to the second memory location; and
transmitting, by the operating system provided by the computing device in response to identifying the first data mover device for performing the first data transfer operation, a first data transfer instruction to the first data mover device that is configured to cause the first data mover device to perform the first data transfer operation to transfer data from the first memory location to the second memory location.

15. The method of claim 14, further comprising:
determining, by the operating system provided by the computing device, that a second data transfer operation provides for the transfer of data from a third memory location in one of the first memory subsystem and the second memory subsystem to a fourth memory location in one of the first memory subsystem and the second memory subsystem;
identifying, by the operating system provided by the computing device using the first data mover selection table, the first data mover device for performing the second data transfer operation based on the first data mover device having the higher priority relative to the second data mover device for performing data transfers from the third memory location in the memory system to the fourth memory location in the memory system;
determining, by the operating system provided by the computing device, that the first data mover device is exceeding a data transfer operation threshold; and
transmitting, by the operating system provided by the computing device in response to determining that the first data mover device is exceeding the data transfer operation threshold, a second data transfer instruction to the second data mover device that is configured to cause the second data mover device to perform the second data transfer operation to transfer data from the third memory location to the fourth memory location.

16. The method of claim 14, wherein the first node is a first Non-Uniform Memory Access (NUMA) node and the second node is a second NUMA node.

17. The method of claim 14, wherein the identifying the first data mover device for performing the first data transfer operation based on the first data mover device having the higher priority relative to the second data mover device for performing data transfers from the first memory location to the second memory location includes:
accessing the first data mover selection table that identifies relative distances of the first data mover device and the second data mover device to each of the first memory location and the second memory location.

18. The method of claim 14, wherein the first data mover device has the higher priority relative to the second data mover device for performing data transfers from the first memory location to the second memory location based on the first data mover device being configured to provide faster data transfers from the first memory location relative to the second data mover device, while the second data mover device is configured to provide faster data transfers from the second memory location relative to the first data mover device.

19. The method of claim 14, further comprising:
discovering, by the BIOS provided by the computing device during a second initialization process that is subsequent to the first initialization process, the first data mover device and a third data mover device; and
generating, by the BIOS provided by the computing device during the second initialization process, a second data mover selection table and that is based on the first data mover device, the third data mover device, the first memory subsystem, and the second memory subsystem, determining, by the operating system provided by the computing device, that a second data transfer operation provides for the transfer of data from a third memory location in one of the first memory subsystem and the second memory subsystem to a fourth memory location in one of the first memory subsystem and the second memory subsystem;

identifying, by the operating system provided by the computing device using the second data mover selection table, the third data mover device for performing the second data transfer operation based on the third data mover device having the higher priority relative to the first data mover device for performing data transfers from the third memory location to the fourth memory location; and transmitting, by the operating system provided by the computing device in response to identifying the third data mover device for performing the second data transfer operation, a second data transfer instruction to the third data mover device that is configured to cause the third data mover device to perform the second data transfer operation to transfer data from the third memory location to the fourth memory location.

20. The method of claim 14, further comprising:

determining, by the operating system provided by the computing device, that a second data transfer operation provides for the transfer of data from a third memory location in one of the first memory subsystem and the second memory subsystem to a fourth memory location in one of the first memory subsystem and the second memory subsystem;

identifying, by the operating system provided by the computing device, a third data mover device for performing the second data transfer operation based on the third data mover device having a higher priority relative to the first data mover device and the second data mover device for performing data transfers from the third memory location to the fourth memory location; and transmitting, by the operating system provided by the computing device in response to identifying the third data mover device for performing the second data transfer operation, a second data transfer instruction to the third data mover device that is configured to cause the third data mover device to perform the second data transfer operation to transfer data from the third memory location to the fourth memory location.

* * * * *